(12) United States Patent
Brockway et al.

(10) Patent No.: US 9,878,450 B2
(45) Date of Patent: Jan. 30, 2018

(54) METHOD AND APPARATUS FOR MULTI-STAGE SPAR ASSEMBLY

(71) Applicant: The Boeing Company, Chicago, IL (US)

(72) Inventors: Monica Joy Brockway, Kirkland, WA (US); Tanni Sisco, Mukilteo, WA (US); Daniel Richard Smith, Jr., Scottsdale, AZ (US); Victor Joseph Bolton, Seattle, WA (US); Fei Cai, Edmonds, WA (US); Eric Scott Patton, Marysville, WA (US); Thomas Dee Hall, Everett, WA (US); Clayton Lynn Munk, Maple Valley, WA (US); James C. Murphy, Kirkland, WA (US); Darrell Darwin Jones, Mill Creek, WA (US); Paul Reed Stone, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 401 days.

(21) Appl. No.: 14/614,886

(22) Filed: Feb. 5, 2015

(65) Prior Publication Data

US 2016/0158940 A1 Jun. 9, 2016

Related U.S. Application Data

(60) Provisional application No. 62/087,220, filed on Dec. 3, 2014.

(51) Int. Cl.
*B25J 9/16* (2006.01)

(52) U.S. Cl.
CPC .......... *B25J 9/1687* (2013.01); *B25J 9/1694* (2013.01); *Y10S 901/01* (2013.01); *Y10S 901/41* (2013.01)

(58) Field of Classification Search
CPC ........ B25J 9/1687; B25J 9/162; B25J 9/1679; B25J 9/1694; Y10S 901/01; Y10S 901/41;
(Continued)

(56) References Cited

U.S. PATENT DOCUMENTS

| | | | |
|---|---|---|---|
| 5,664,311 A | * | 9/1997 | Banks .................. B21J 15/022 29/33 K |
| 6,170,157 B1 | | 1/2001 | Munk et al. |

(Continued)

OTHER PUBLICATIONS

European Patent Office Search Report, dated Sep. 28, 2016, regarding Application No. 15190076.8, 9 pages.
(Continued)

*Primary Examiner* — Dennis M Butler
(74) *Attorney, Agent, or Firm* — Yee & Associates, P.C.

(57) ABSTRACT

A method and apparatus for positioning one component relative to another component. First metrology data may be identified for a first component and second metrology data may be identified for a second component. First locations of first features may be identified on the first component using the first metrology data. Second locations of second features on the second component may be identified using the second metrology data. A transformation may be computed based on the first locations identified and the second locations identified for use in modifying a movement plan of a robotic system for positioning the second component relative to the first component.

25 Claims, 15 Drawing Sheets

(58) Field of Classification Search
CPC ...... G05B 19/18; G05B 19/19; G05B 19/402; G05B 19/404; G05B 19/41805; G05B 19/41815; G05B 2219/31068
See application file for complete search history.

(56) References Cited

U.S. PATENT DOCUMENTS

| | | |
|---|---|---|
| 2003/0090682 A1 | 5/2003 | Gooch et al. |
| 2005/0172470 A1 | 8/2005 | Cobb et al. |
| 2005/0203661 A1* | 9/2005 | Hollingshead ......... G01B 21/04 700/175 |
| 2008/0203708 A1* | 8/2008 | Okumura ............... B23K 26/04 280/728.3 |
| 2011/0282483 A1* | 11/2011 | Simonetti ............ G05B 19/402 700/114 |

OTHER PUBLICATIONS

Partial European Search Report, dated Jun. 9, 2016, regarding application 15190076.8, 6 pages.

* cited by examiner

METHOD AND APPARATUS FOR MULTI-STAGE SPAR ASSEMBLY

RELATED PROVISIONAL APPLICATION

This application claims the benefit of U.S. Provisional Patent Application Ser. No. 62/087,220, filed Dec. 3, 2014, and entitled "Method and Apparatus for Multi-Stage Spar Assembly."

BACKGROUND INFORMATION

1. Field

The present disclosure relates generally to building assemblies and, in particular, to building an assembly in multiple stages. Still more particularly, the present disclosure relates to a method and apparatus for precisely positioning parts relative to each other using metrology data and features of the parts during an assembly process.

2. Background

Some types of assemblies are currently being built manually. As one example, some currently available spar assemblies for aircraft are built manually by human operators. However, building a spar assembly manually may be more time-consuming than desired. Further, this type of manual assembly process may be more complex than desired. Still further, manually building spar assemblies may not provide the level of quality and consistency desired for spar assemblies.

Consequently, it may be desirable to automate portions of the assembly process using robotic systems. However, using robotic systems in a factory setting may be more difficult than desired. Currently available methods and systems for using robotic systems to perform certain types of assembly operations may not provide the type of mobility and flexibility within the factory that is desired.

Additionally, some currently available methods for positioning parts relative to each other for attachment using robotic systems may not provide the desired level of accuracy with respect to the positioning of these parts. Therefore, it would be desirable to have a method and apparatus that take into account at least some of the issues discussed above, as well as other possible issues.

SUMMARY

In one illustrative example, an apparatus may comprise a metrology system, a feature locator, and a robot manager. The metrology system may generate first metrology data for a first component and second metrology data for a second component. The feature locator may process the first metrology data and the second metrology data to identify first locations of first features on the first component and second locations of second features on the second component. The robot manager may compute a transformation based on the first locations identified and the second locations identified for use in modifying a movement plan of a robotic system for positioning the second component relative to the first component.

In another illustrative example, a method positioning one component relative to another component may be provided. First metrology data may be identified for a first component and second metrology data may be identified for a second component. First locations of first features may be identified on the first component using the first metrology data. Second locations of second features on the second component may be identified using the second metrology data. A transformation may be computed based on the first locations identified and the second locations identified for use in modifying a movement plan of a robotic system for positioning the second component relative to the first component.

In yet another illustrative example, a flexible manufacturing system comprises a mobile tooling system, a plurality of robotic systems, and a control system. The mobile tooling system may hold a spar and transport the spar to each of a plurality of stage areas. The plurality of robotic systems may perform at least one of part positioning operations, fastening operations, sealant operations, and fastener installation operations within each stage area of the plurality of stage areas to build a spar assembly using the spar. The control system may control the mobile tooling system and the plurality of robotic systems.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
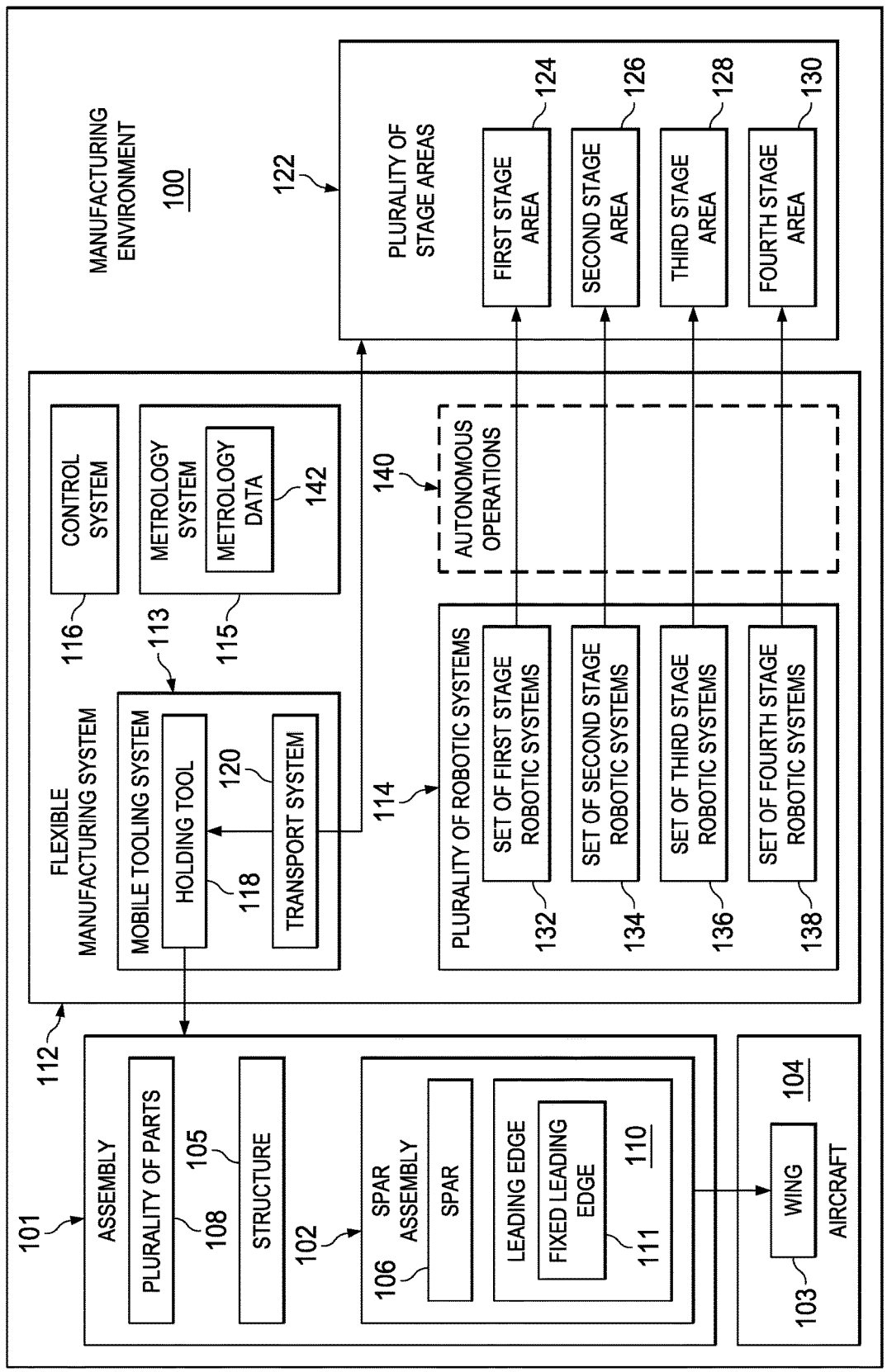
FIG. 1 is an illustration of a manufacturing environment in the form of a block diagram in accordance with an illustrative embodiment.

The illustrative embodiments recognize and take into account a number of considerations. For example, the illustrative embodiments recognize and take into account that it may be desirable to improve factory flexibility when performing an assembly of components. Further, it may be desirable to improve the accuracy and consistency of assembly operations performed in a factory-type setting. Still further, it may be desirable to reduce the overall time needed to perform assembly operations.

The illustrative embodiments recognize and take into account that automating assembly operations using robotic systems and a multi-stage setup may help achieve these desired improvements. As one illustrative example, robotic systems may be used to perform the building of a spar assembly. Using these robotic systems may help reduce or eliminate the need for disassembling manufacturing components for cleaning and de-burring and then reassembling these manufacturing components during the building of the spar assembly.

The illustrative embodiments further recognize and take into account that it may be desirable to build a spar assembly by moving the spar assembly through multiple stage areas. For example, it may be desirable to build a spar assembly in stages along an assembly line. Automating at least a portion of the building of the spar assembly along the assembly line may present unique challenges with respect to positioning parts for the spar assembly relative to each other during assembly operations, positioning tools relative to the parts, maintaining a position and orientation of the spar assembly as the spar assembly is being built, or some combination thereof.

Thus, the illustrative embodiments provide a flexible manufacturing system that comprises a mobile tooling system, a plurality of robotic systems, and a control system. The mobile tooling system may be used to hold a spar and transport the spar to each of a plurality of stage areas. In particular, the mobile tooling system may hold the spar and any parts attached to the spar in a selected configuration as the spar is transported to each of the plurality of stage areas. The mobile tooling system may hold the spar assembly in the selected configuration within selected tolerances in a manner that enables improved flow through the assembly line.

The plurality of robotic systems may perform at least one of part positioning operations, fastening operations, sealant operations, or fastener installation operations within each stage area of the plurality of stage areas to build a spar assembly using the spar. The control system may control the mobile tooling system and the plurality of robotic systems.

The illustrative embodiments also provide a method for positioning one component relative to another component using a robotic system. In one illustrative example, first metrology data may be identified for a first component and second metrology data may be identified for a second component. First locations of first features may be identified on the first component using the first metrology data. Second locations of second features on the second component may be identified using the second metrology data. A transformation may be computed based on the first locations identified and the second locations identified for use in modifying a movement plan of a robotic system for positioning the second component relative to the first component.

The movement plan may be modified using the transformation to form a modified movement plan. The second component may then be moved according to the modified movement plan to position the second component relative to the first component within selected tolerances. In some illustrative examples, after the second component has been positioned relative to the first component, component-to-component indexing may be performed to refine a placement of the second component relative to the first component. This refinement may be performed to achieve a mating or "fitup" between the first component and the second component that is within selected tolerances. The selected tolerances may be tight tolerances.

The illustrative embodiments recognize and take into account that in some cases, a predictive shimming process may be used to position parts relative to each other. In particular, a predictive shimming process may be incorporated in the assembly process to facilitate automation of the building of a spar assembly along an assembly line. The predictive shimming process may be used in addition to or in place of the transformation of the movement plan of the robotic system, described above, to appropriately fit parts together within selected tolerances.

As one illustrative example, a spar and a part for attachment on the spar may be scanned at the feature level using one or more imaging systems before or early in the assembly process. The dimensions of the scanned features may be compared based on the fit required between the spar and the part. A determination may then be made as to whether any shims are needed to ensure a fit within selected tolerances. Any shims needed may be, for example, without limitation, fabricated on point-of-use shim mills, manually attached to the individual components, and then delivered to the appropriate stage area for installation on the spar.

Referring now to the figures and, in particular, with reference to FIG. 1, an illustration of a manufacturing environment is depicted in the form of a block diagram in accordance with an illustrative embodiment. In this illustrative example, manufacturing environment 100 may be an example of an environment in which assembly 101 may be built. Assembly 101 may be an assembly or a sub-assembly, depending on the implementation.

Assembly 101 may be for an aerospace platform, a ground platform, a water platform, a building, a bridge, or some other type of platform or structural system. In some cases, assembly 101 may be for an aerospace vehicle, a ground vehicle, a space vehicle, a water vehicle, or some other type of vehicle. In one illustrative example, assembly 101 may be an assembly comprised of aerospace structures for an aerospace vehicle. For example, without limitation, assembly 101 may take the form of spar assembly 102. Spar assembly 102 may be used to form wing 103 for aircraft 104.

Assembly 101 may include structure 105 and plurality of parts 108 that are to be assembled together. Each part in plurality of parts 108 may take the form of an individual part or component, a sub-assembly, or some other type of assembly.

When assembly 101 takes the form of spar assembly 102, structure 105 may take the form of spar 106. Plurality of parts 108 may include, for example, without limitation, rib pots, stiffeners, hinges, brackets, other types of elements or members, leading edge parts, or some combination thereof. In this illustrative example, at least a portion of plurality of parts 108 may form leading edge 110 for spar 106. In some cases, leading edge 110 may be referred to as fixed leading edge 111.

In these illustrative examples, assembly 101 may refer to assembly 101 at any stage during the building of assembly 101. For example, without limitation, assembly 101 may refer to structure 105 only, structure 105 with one or more of plurality of parts 108 installed on structure 105, or structure 105 with all of plurality of parts 108 installed on structure 105.

Flexible manufacturing system 112 may be used to build assembly 101. At least a portion of the components and systems that make up flexible manufacturing system 112 may be configured to operate autonomously. In this manner, flexible manufacturing system 112 may be referred to as an autonomous or semi-autonomous flexible manufacturing system in some cases. Flexible manufacturing system 112 may include mobile tooling system 113, plurality of robotic systems 114, metrology system 115, and control system 116.

Mobile tooling system 113 may include holding tool 118 and transport system 120. Holding tool 118 may be used to hold assembly 101 in a selected configuration within selected tolerances during and, in some cases, after the building of assembly 101. This selected configuration may include, for example, without limitation, a selected orientation for assembly 101 with respect to some coordinate system. Holding tool 118 may include any number of elements, members, components, or devices that may be used to hold assembly 101 in the selected configuration. Depending on the implementation, the selected configuration for assembly 101 may be different for various stages of the assembly process used to build assembly 101.

In one illustrative example, holding tool 118 may hold structure 105. Structure 105 may be loaded onto holding tool 118. Holding tool 118 may hold structure 105 in the selected configuration as plurality of parts 108 are installed on structure 105 to build assembly 101. In this manner, holding tool 118 may thereby hold assembly 101 in the selected configuration.

Transport system 120 may be used to transport assembly 101 within manufacturing environment 100. As one illustrative example, transport system 120 may be used to transport holding tool 118 holding assembly 101, and thereby assembly 101, within manufacturing environment 100. For example, without limitation, transport system 120 may be used to move holding tool 118 and thereby, assembly 101, to each of plurality of stage areas 122 in manufacturing environment 100.

Each of plurality of stage areas 122 may be an area in which one or more operations of the assembly process for building assembly 101 may be performed. In particular, each of plurality of stage areas 122 may correspond to a different stage in the assembly process for building assembly 101. Plurality of stage areas 122 may include one, two, three, four, five, ten, or some other number of stage areas depending on the implementation. In one illustrative example, plurality of stage areas 122 may include first stage area 124, second stage area 126, third stage area 128, and fourth stage area 130.

As depicted, plurality of robotic systems 114 may be used to perform operations, including autonomous operations 140, in plurality of stage areas 122. In one illustrative example, plurality of robotic systems 114 may include set of first stage robotic systems 132, set of second stage robotic systems 134, set of third stage robotic systems 136, and set of fourth stage robotic systems 138.

Set of first stage robotic systems 132, set of second stage robotic systems 134, set of third stage robotic systems 136, and set of fourth stage robotic systems 138 may be used to perform operations, including, but not limited to, autonomous operations 140 in first stage area 124, second stage area 126, third stage area 128, and fourth stage area 130, respectively. As used herein, a "set of" items may include one or more items. In this manner, set of first stage robotic systems 132 may include one or more first stage robotic systems.

In these illustrative examples, assembly 101 may be moved from stage area to stage area using a micro-pulse flow or full-pulse flow. With the micro-pulse flow, spar 106 may partially enter one stage area. Once the operations designated for that stage area have been completed, spar 106 may move a small length or distance to allow robotic access to the next section of spar 106. The previously completed section of spar 106 may then have additional work completed on it while the automated process is occurring. In this manner, concurrent work may occur at the same time on different areas of spar 106 even within a same stage area.

With the full-pulse flow, spar 106 may enter a stage area such that the full length of spar 106 is within that stage area. All operations required in that stage area may be completed prior to moving the full spar 106 to the next stage area. In some cases, continuous flow may be employed. In other words, spar 106 may be continually moved through a stage area and then from that stage area to another stage area at a substantially constant speed or variable speed, depending on the implementation.

Metrology system 115 may be used to provide metrology data 142 that can be used to control the movement and positioning of one or more of plurality of robotic systems 114. For example, without limitation, control system 116 may use metrology data 142 to control plurality of robotic systems 114. Metrology data 142 may be used to precisely position each of plurality of parts 108 relative to one of structure 105 or another one of plurality of parts 108 for assembly 101. As one illustrative example, metrology data 142 may be used to ensure that a first component, such as structure 105, and a second component, such as one of plurality of parts 108, are mated optimally.

Control system 116 may be comprised of a set of controllers. In this illustrative example, each of the set of controllers in control system 116 may be implemented using software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations performed by the controller. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and/or processes performed by the controller may be performed using organic components integrated with inorganic components. In some cases, the operations and/or processes may be performed by entirely organic components, excluding a human being. As one illustrative example, circuits in organic semiconductors may be used to perform these operations and/or processes.

In these illustrative examples, one or more of the set of controllers that form control system 116 may be associated with each of plurality of robotic systems 114. Similarly, metrology system 115 may include metrology devices. One or more metrology devices may be associated with each of plurality of robotic systems 114. In some illustrative examples, one or more of metrology devices may be associated with a frame or support structure in manufacturing environment 100.

As used herein, when one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Figure 2:
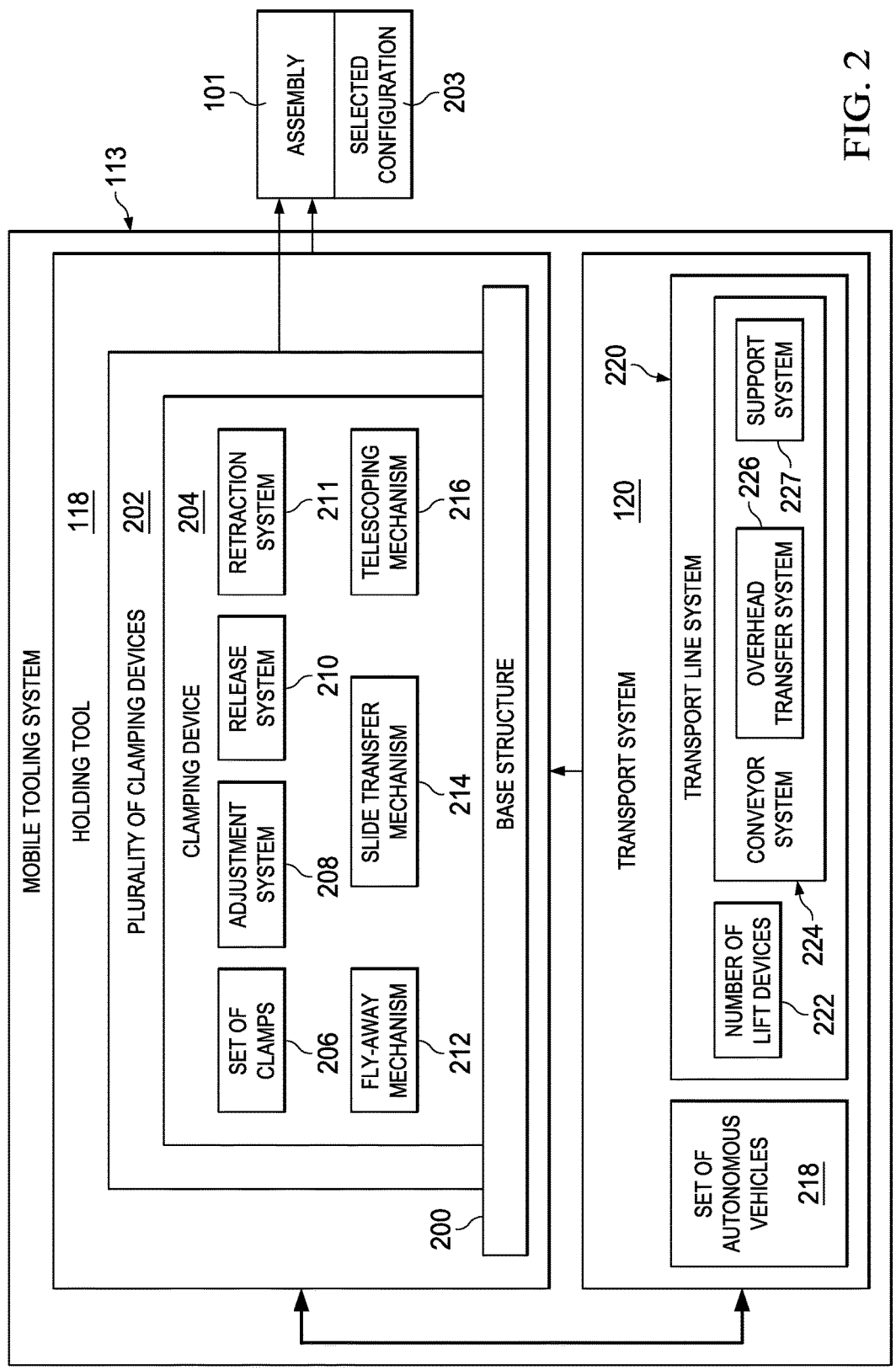
FIG. 2 is an illustration of a mobile tooling system in the form of a block diagram in accordance with an illustrative embodiment.

With reference now to FIG. 2, an illustration of mobile tooling system 113 from FIG. 1 is depicted in the form of a block diagram in accordance with an illustrative embodiment. As described above, mobile tooling system 113 may include holding tool 118 and transport system 120.

Holding tool 118 may be associated with base structure 200 in some illustrative examples. Holding tool 118 may include plurality of clamping devices 202 in one illustrative example. Plurality of clamping devices 202 may be used to clamp assembly 101 to base structure 200. In particular, plurality of clamping devices 202 may be used to hold assembly 101 in selected configuration 203 within selected tolerances. Selected configuration 203 may include a position, orientation, or both for assembly 101. The position, orientation, or both may be, for example, without limitation, relative to base structure 200 or some type of reference coordinate system.

Clamping device 204 may be an example of one of plurality of clamping devices 202. As depicted, clamping device 204 may include set of clamps 206, adjustment system 208, release system 210, retraction system 211, or some combination thereof. Retraction system 211 may include, for example, without limitation, fly-away mechanism 212, slide transfer mechanism 214, and telescoping mechanism 216. In other illustrative examples, holding tool 118 may be implemented in some other manner. Holding tool 118 may be implemented in any of a number of different ways that are configured to hold and maintain assembly 101 in FIG. 1 in selected configuration 203 within selected tolerances.

In these illustrative examples, transport system 120 may be used to transport holding tool 118 with assembly 101 between various areas. As one illustrative example, transport system 120 may be used to autonomously transport holding tool 118 with assembly 101 from one stage area in plurality of stage areas 122 in FIG. 1 to another stage area in plurality of stage areas 122.

Transport system 120 may be implemented in a number of different ways. In one illustrative example, transport system 120 may take the form of set of autonomous vehicles 218. Each of set of autonomous vehicles 218 may take the form of, for example, without limitation, an automated guided vehicle (AGV). In another illustrative example, transport system 120 may take the form of transport line system 220. Transport line system 220 may be implemented using at least one of number of lift devices 222 or conveyor system 224. Conveyor system 224 may take the form of overhead transfer system 226 or support system 227, depending on the implementation.

In one illustrative example, number of lift devices 222 may be used to lift up holding tool 118. In some cases, number of lift devices 222 may also be used to move holding tool 118. In other illustrative examples, number of lift devices 222 may be associated with conveyor system 224, which may be used to move holding tool 118 carrying assembly 101. Overhead transfer system 226 may be a system that moves holding tool 118 while supporting holding tool 118 from above holding tool 118. Support system 227 may be a system that moves holding tool 118 while supporting holding tool 118 from beneath holding tool 118. In some cases, support system 227 may take the form of a conveyor-belt-type system.

Figure 3:
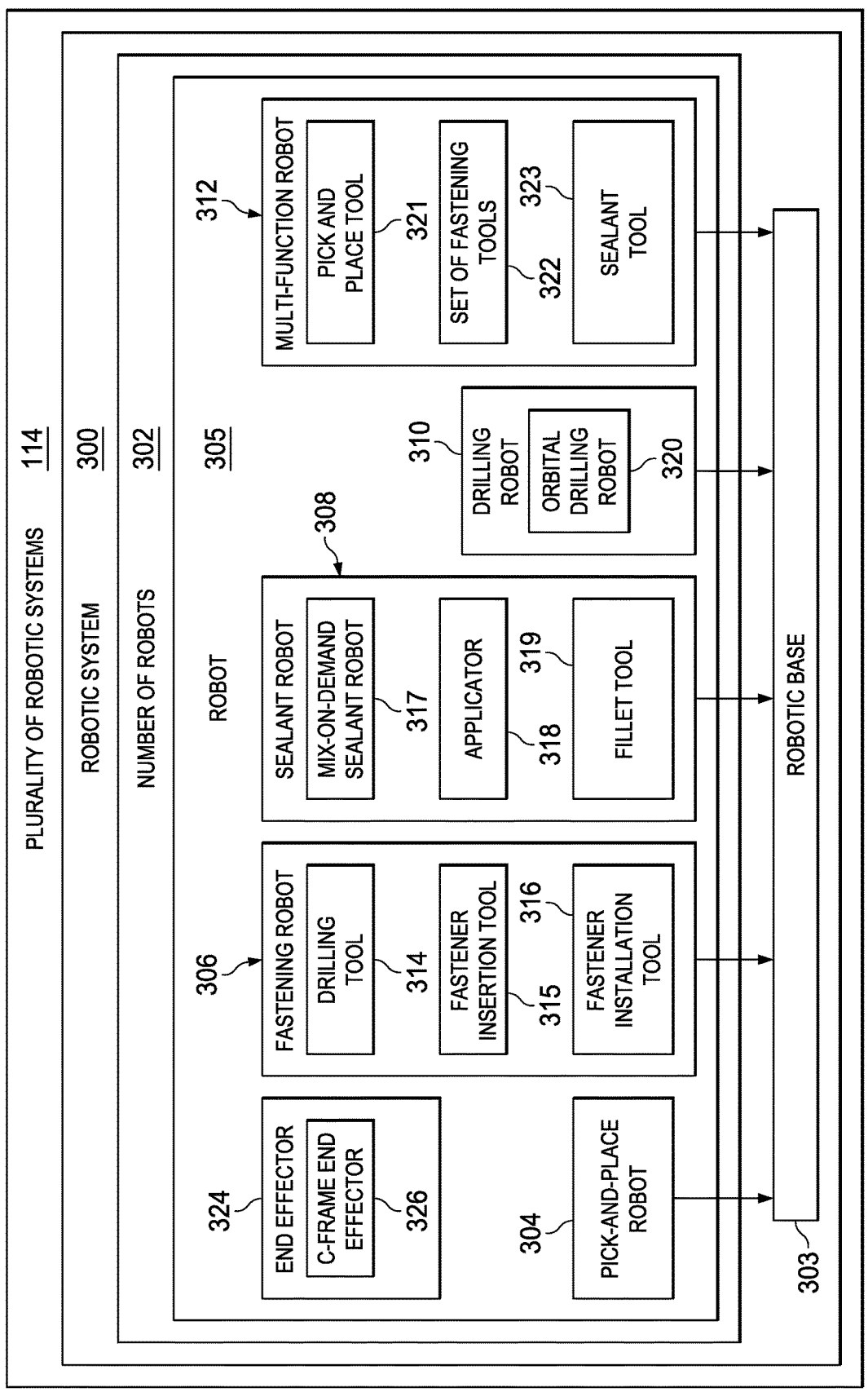
FIG. 3 is an illustration of a plurality of robotic systems in the form of a block diagram in accordance with an illustrative embodiment.

With reference now to FIG. 3, an illustration of plurality of robotic systems 114 from FIG. 1 is depicted in the form of a block diagram in accordance with an illustrative embodiment. Robotic system 300 may be an example of one of plurality of robotic systems 114.

As depicted, robotic system 300 may include number of robots 302 associated with robotic base 303. As used herein, a "number of" items may include one or more items. In this manner, number of robots 302 may include one or more robots.

Each of number of robots 302 may be implemented using, for example, without limitation, a robotic arm or some other type of robotic device. In one illustrative example, one or more of number of robots 302 may take the form of a jointed-arm robot. Depending on the implementation, each of number of robots 302 may be configured to provide movement and positioning of at least one tool center point (TCP) corresponding to that robot with at least one degree of freedom. As one illustrative example, each of number of robots 302 may take the form of a robotic arm capable of providing movement with up to six degrees of freedom or more.

In this illustrative example, a robot in number of robots 302 may take a number of different forms. For example, without limitation, robot 305 may take the form of pick-and-place robot 304, fastening robot 306, sealant robot 308, drilling robot 310, multi-function robot 312, or some other type of robot. Pick-and-place robot 304 may be configured to pick up a part, such as one of plurality of parts 108 in FIG. 1, and place that part in a particular position with respect to some reference coordinate system within selected tolerances.

Fastening robot 306 may be configured to perform any number of fastening operations. These fastening operations may include drilling operations, fastener insertion operations, fastener installation operations, riveting operations, inspection operations, other types of operations, or some combination thereof. As one illustrative example, fastening robot 306 may include drilling tool 314, fastener insertion tool 315, and fastener installation tool 316.

In this illustrative example, sealant robot 308 may be used to apply sealant onto assembly 101 in FIG. 1. In one illustrative example, sealant robot 308 may take the form of mix-on-demand sealant robot 317.

As depicted, sealant robot 308 may include applicator 318, which may be used to brush sealant onto one or more surfaces. In some cases, sealant robot 308 may include fillet tool 319. Fillet tool 319 may be used to apply sealant in a manner that creates a fillet at an interface between two or more parts or components.

Drilling robot 310 may be configured to perform drilling operations. Drilling robot 310 may be used to drill holes into at least one of structure 105 in FIG. 1 or a part in plurality of parts 108 in FIG. 1. In some cases, drilling robot 310 may take the form of orbital drilling robot 320. Orbital drilling robot 320 may be used to perform orbital drilling operations to form a plurality of holes in spar assembly 102. The plurality of holes may be configured to receive a plurality of fasteners.

Multi-function robot 312 may be configured to perform multiple functions. For example, without limitation, multi-function robot 312 may be configured to perform some combination of pick-and-place operations, drilling operations, fastener insertion operations, fastener installation operations, sealant application operations, inspection operations, or other types of operations. In one illustrative example, multi-function robot 312 may include at least one of pick-and-place tool 321, set of fastening tools 322, or sealant tool 323. Set of fastening tools 322 may include at least one of a drilling tool, a fastener insertion tool, a fastener installation tool, an inspection tool, or some other type of tool.

In these illustrative examples, each of number of robots 302 may have at least one end effector associated with that robot. For example, without limitation, robot 305 may have end effector 324 associated with robot 305. End effector 324 may be integrated as part of robot 305 or removably associated with robot 305. Any number of tools may be associated with end effector 324.

In one illustrative example, end effector 324 may take the form of C-frame end effector 326. When more than one operation may be performed using one or more tools associated with end effector 324, C-frame end effector 326 may be referred to as a C-frame multi-function end effector.

Any number of tools may be associated with end effector 324. These tools may be referred to as end of arm tooling (EOAT), in some cases. Material handling end of arm tooling (MH-EOAT) may pick and place components relative to, for example, spar 106 in FIG. 1 within selected tolerances. Multi-function end of arm tooling (MF-EOAT) may include the capability to perform at least one of clamping parts together, drilling holes with a desired level of quality and accuracy, applying sealant to fasteners, inserting fasteners, sealing fastener threads, installing nuts or collars, or performing some other type of assembly operation. Multi-function end of arm tooling may also be capable of inspecting at least one of fasteners, sealant application on fasteners, fastener sleeve protrusion, sealant application on threads, or some other type of parameter. Application end of arm tooling (A-EOAT) may include the ability to apply sealant to parts using different methods. These methods may include brush application to nozzle application for forming fillets. In some cases, the system may have a mix-on-demand system that will allow sealant to be metered and dynamically mixed for application. Using robotic system 300 to perform these different types of assembly operations described above may provide the flexibility needed for certain operations to be performed concurrently.

Figure 4:
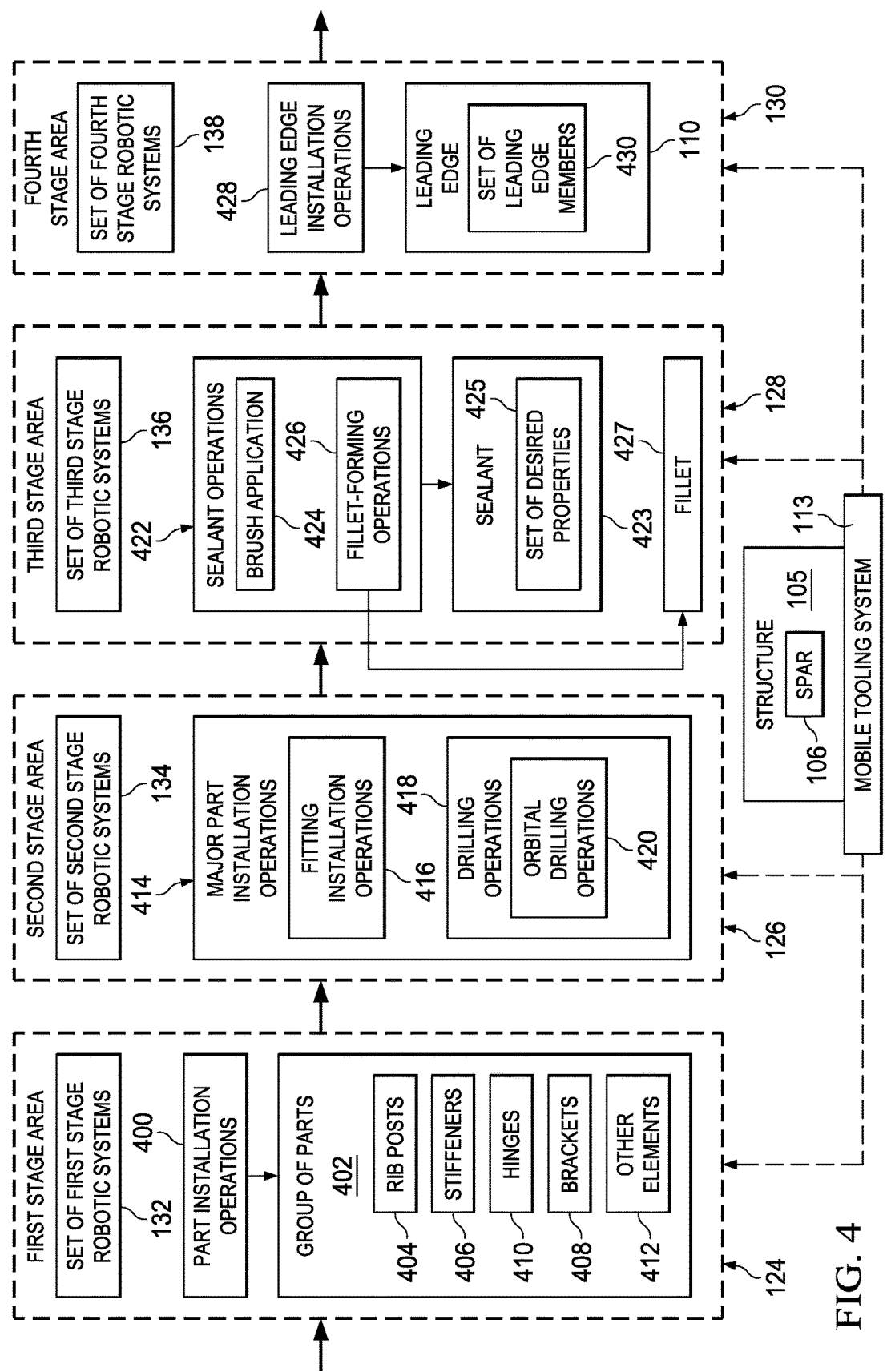
FIG. 4 is an illustration of a first stage area, a second stage area, a third stage area, and a fourth stage area in the form of a block diagram in accordance with an illustrative embodiment.

With reference now to FIG. 4, an illustration of first stage area 124, second stage area 126, third stage area 128, and fourth stage area 130 from FIG. 1 is depicted in the form of a block diagram in accordance with an illustrative embodiment. In this illustrative example, the different types of operations that may be performed within these different stage areas are described.

In one illustrative example, set of first stage robotic systems 132 may be used to perform part installation operations 400. In particular, part installation operations 400 may be performed to install group of parts 402 on structure 105 while structure 105 is held by mobile tooling system 113. When structure 105 takes the form of spar 106, group of parts 402 may include any number of rib posts 404, stiffeners 406, hinges 410, brackets 408, other elements 412, or some combination thereof. One or more of group of parts 402 may be installed on a front side of spar 106, while one or more of group of parts 402 may be installed on a rear side of spar 106.

In one illustrative example, a robotic system in set of first stage robotic systems 132 may be used to pick up a part in group of parts 402 and position that part relative to structure 105 such that the part and the structure may be optimally fit together. In other words, the part may be positioned relative to structure 105 such that the part may be optimally mated with structure 105. The same or different robotic system of set of first stage robotic systems 132 may be used to fasten the part to structure 105. For example, the robotic system may perform one or more drilling operations, fastener insertion operations, and fastener installation operations to fasten the part to structure 105.

Within second stage area 126, set of second stage robotic systems 134 may be used to perform major part installation operations 414. Major part installation operations 414 may include, for example, without limitation, fitting installation operations 416. These installation operations may be performed in a manner similar to part installation operations 400. In some illustrative examples, major part installation operations 414 may include drilling operations 418 in the form of orbital drilling operations 420.

In other illustrative examples, part installation operations 400 and major part installation operations 414 may be performed in a same stage area instead of two separate stage areas. In these examples, any combination of robotic systems from set of first stage robotic systems 132 and set of second stage robotic systems 134 may be used to perform these operations.

Within third stage area 128, set of third stage robotic systems 136 may perform sealant operations 422. Sealant operations 422 may include brush application 424, fillet-forming operations 426, or both. Sealant operations 422 may be performed to apply sealant 423 having set of desired properties 425. In some cases, one or more of sealant operations 422 may be performed using a mix-on-demand sealant robot, such as mix-on-demand sealant robot 317 in FIG. 3. In these cases, sealant 423 may be mixed for application as sealant 423 is to be applied to ensure that sealant 423 is applied having set of desired properties 425. Set of desired properties 425 may include at least one of thickness, shape, or some other type of property. Fillet-forming operations 426 may be used to form, for example, fillet 427.

Within fourth stage area 130, set of fourth stage robotic systems 138 may be used to perform leading edge installation operations 428 for building leading edge 110 on spar 106. In particular, leading edge installation operations 428 may be performed to install set of leading edge members 430 onto spar 106. Set of leading edge members 430 together may form leading edge 110. In this illustrative example, leading edge installation operations 428 may be performed in a manner similar to part installation operations 400, major part installation operations 414, or both, as described above.

In these illustrative examples, leading edge installation operations 428 may include individually positioning each of set of leading edge members 430 relative to spar 106 using at least one of set of fourth stage robotic systems 138. Then, at least one of set of fourth stage robotic systems 138 may position a particular leading edge member of set of leading edge members 430 using a movement plan that is modified based on a transformation computed using imaging data for the leading edge member, imaging data for spar 106, or both. This type of positioning of the leading edge member relative to spar 106 may be referred to as metrology-based positioning. An example of one manner in which this type of metrology-based positioning may be performed is described in greater detail in FIG. 5 below.

Leading edge installation operations 428 may also include performing component-to-component indexing. For example, without limitation, once a leading edge member has been positioned relative to spar 106 using metrology-based positioning, component-to-component indexing may be used to refine the placement of the leading edge member relative to spar 106.

Component-to-component indexing may include moving a first component relative to a second component to position the first component relative to the second component based on a number of physical features of the second component. The number of physical features may include, for example, without limitation, at least one of a surface, a surface feature, an interface between the second component and another component, an interface between two features on the second component, or some other type of feature. This type of physical component-to-component indexing may be performed after the metrology-based positioning of one component relative to another component to improve the fit, or "fitup," between these two components.

The various operations performed in first stage area 124, second stage area 126, third stage area 128, and fourth stage area 130 as described above may be only one illustrative examples of the different types of operations that may be performed in each of these stage areas. Any number of different types of operations may be performed in each stage area. Further, the same types of operations may be performed in more than one of these stages areas, depending on the implementation.

Figure 5:
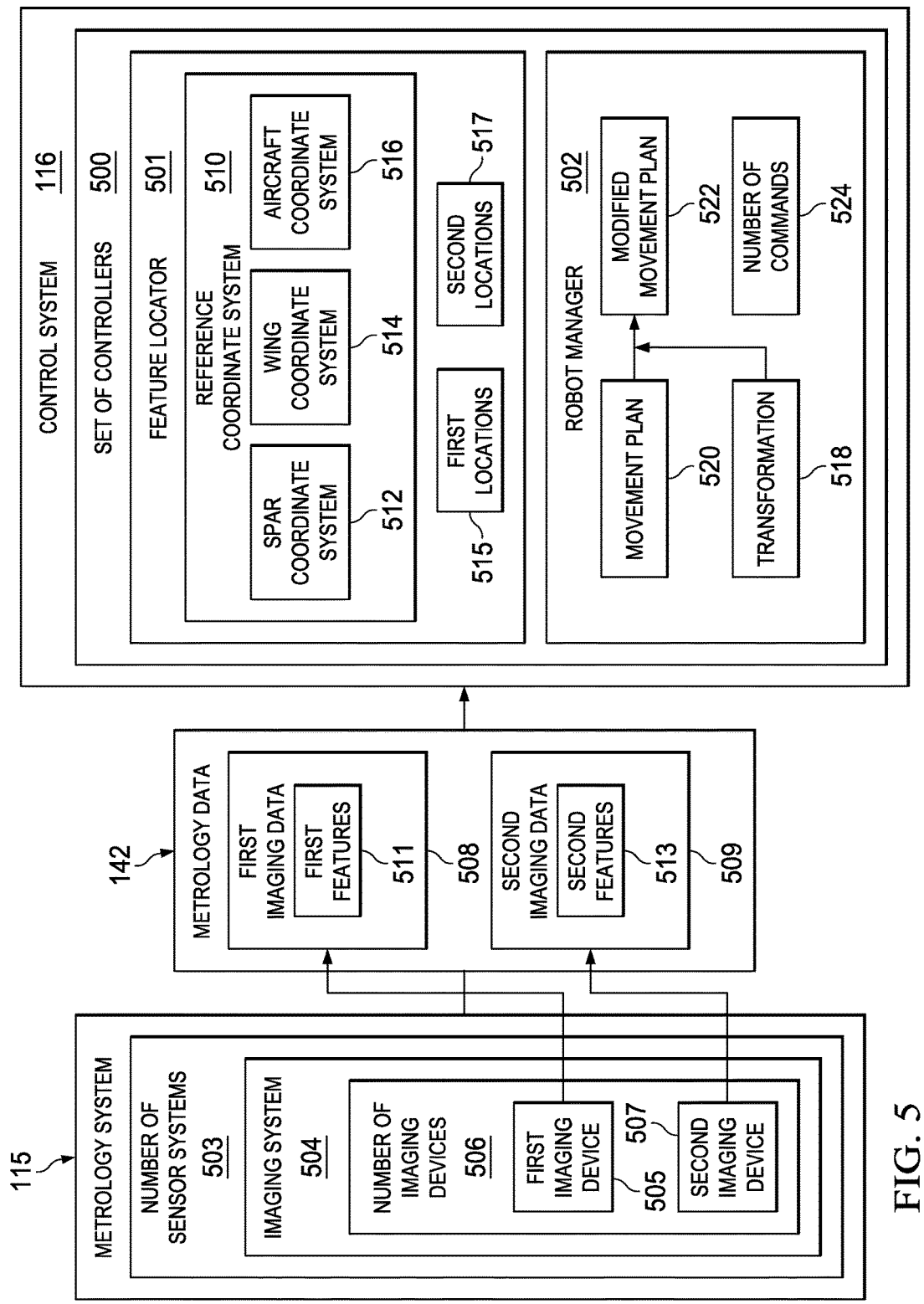
FIG. 5 is an illustration of a control system in the form of a block diagram in accordance with an illustrative embodiment.

With reference now to FIG. 5, an illustration of control system 116 from FIG. 1 is depicted in the form of a block diagram in accordance with an illustrative embodiment. In this illustrative example, control system 116 may include set of controllers 500. Feature locator 501 and robot manager 502 may each be implemented using at least a portion of set of controllers 500.

Feature locator 501 may receive metrology data 142 from metrology system 115. Metrology system 115 may include number of sensor systems 503. Number of sensor systems 503 may take any number of different forms. Depending on the implementation, number of sensor systems 503 may include at least one of imaging system 504, a laser system, an infrared system, a radar-based system, or some other type of sensor system. Depending on the implementation, number of sensor systems 503 may include any number of encoders, measurement devices, probes, or other types of devices that may be used to generate metrology data 142.

Imaging system 504 may include number of imaging devices 506. Number of imaging devices 506 may take the form of a number of cameras. In one illustrative example, one or more of number of imaging devices 506 may be associated with one or more of plurality of robotic systems 114 in FIGS. 1 and 3. In some cases, more than one of number of imaging devices 506 may be associated with a same robotic system in plurality of robotic systems 114 in FIGS. 1 and 3. In other illustrative examples, one or more of number of imaging devices 506 may be associated with mobile tooling system 113 described in FIGS. 1 and 2.

In this illustrative example, metrology data 142 may include, for example, without limitation, first metrology data for a first component and second metrology data for a second component. As one example, first imaging device 505 of imaging system 504 may be used to generate first imaging data 508 of a region of a first component. First imaging data 508 may capture first features 511 on the surface of the first component. In some cases, depending on the type of first imaging device 505, first features 511 captured may include features below a surface of the first component.

Second imaging device 507 of imaging system 504 may then be used to generate second imaging data 509 of a region of a second component that is to be mated with the first component. Second imaging data 509 may capture second features 513 on the surface of the second component. In some cases, depending on the type of second imaging device 507, second features 513 captured may include features below a surface of the first component.

Feature locator 501 may receive and process first imaging data 508 and second imaging data 509. Feature locator 501 may identify first locations 515 of first features 511 on the first component using first imaging data 508. Feature locator 501 may identify second locations 517 of second features 513 on the second component using second imaging data 509.

In this illustrative example, first locations 515 and second locations 517 may be identified with respect to reference coordinate system 510. Reference coordinate system 510 may take the form of spar coordinate system 512, wing coordinate system 514, aircraft coordinate system 516, or some other type of coordinate system, depending on the implementation. In this illustrative example, reference coordinate system 510 may be a three-dimensional coordinate system.

Robot manager 502 may compute transformation 518 based on first locations 515 and second locations 517 identified by feature locator 501. In particular, robot manager 502 may compute transformation 518 for use in modifying movement plan 520 of a robotic system for positioning the second component relative to the first component. Movement plan 520 of the robotic system may be, for example, without limitation, a nominal movement plan. This nominal movement plan may be comprised of any number of movements for positioning the second component relative to the first component when first features 511 on the first component and second features 513 on the second component are in expected or desired locations.

Robot manager 502 computes transformation 518 needed to modify movement plan 520 based on first locations 515 identified for first features 511 and second locations 517 identified for second features 513. Movement plan 520 may be modified using transformation 518 to form modified movement plan 522.

In one illustrative example, modified movement plan 522 may be sent directly to the robotic system and the robotic system may use modified movement plan 522 to move the second component into the desired position relative to the first component. In other illustrative examples, robot manager 502 may generate number of commands 524 for the robotic system based on modified movement plan 522. Robot manager 502 sends number of commands 524 to the robotic system to control the robotic system to move the second component into the desired position relative to the first component.

When the robotic system moves and positions the second component relative to the first component based on modified movement plan 522, the second component may be mated with the first component with the desired fit within selected tolerances. This fit may be referred to as the best fit or optimal fit. In this manner, modified movement plan 522 may enable a desired mating between the first component and the second component.

In this manner, control system 116 uses metrology data 142 to compute a transformation that is at least one-dimensional and that enables mechanical compensation in the movement of robotic systems to accommodate for part variation. Control system 116 may compute a transformation that allows a robotic system to be oriented and controlled in a manner that positions one component relative to another component to ensure an optimal fit when mating these two components.

The illustrations in FIGS. 1-5 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Turning now to FIGS. 6-12, illustrations of a process for building a spar assembly are depicted in accordance with illustrative embodiments. These illustrations are intended as one example of how a spar assembly, such as spar assembly 102 in FIG. 1 may be built using a flexible manufacturing system, such as flexible manufacturing system 112 in FIG. 1.

Figure 6:
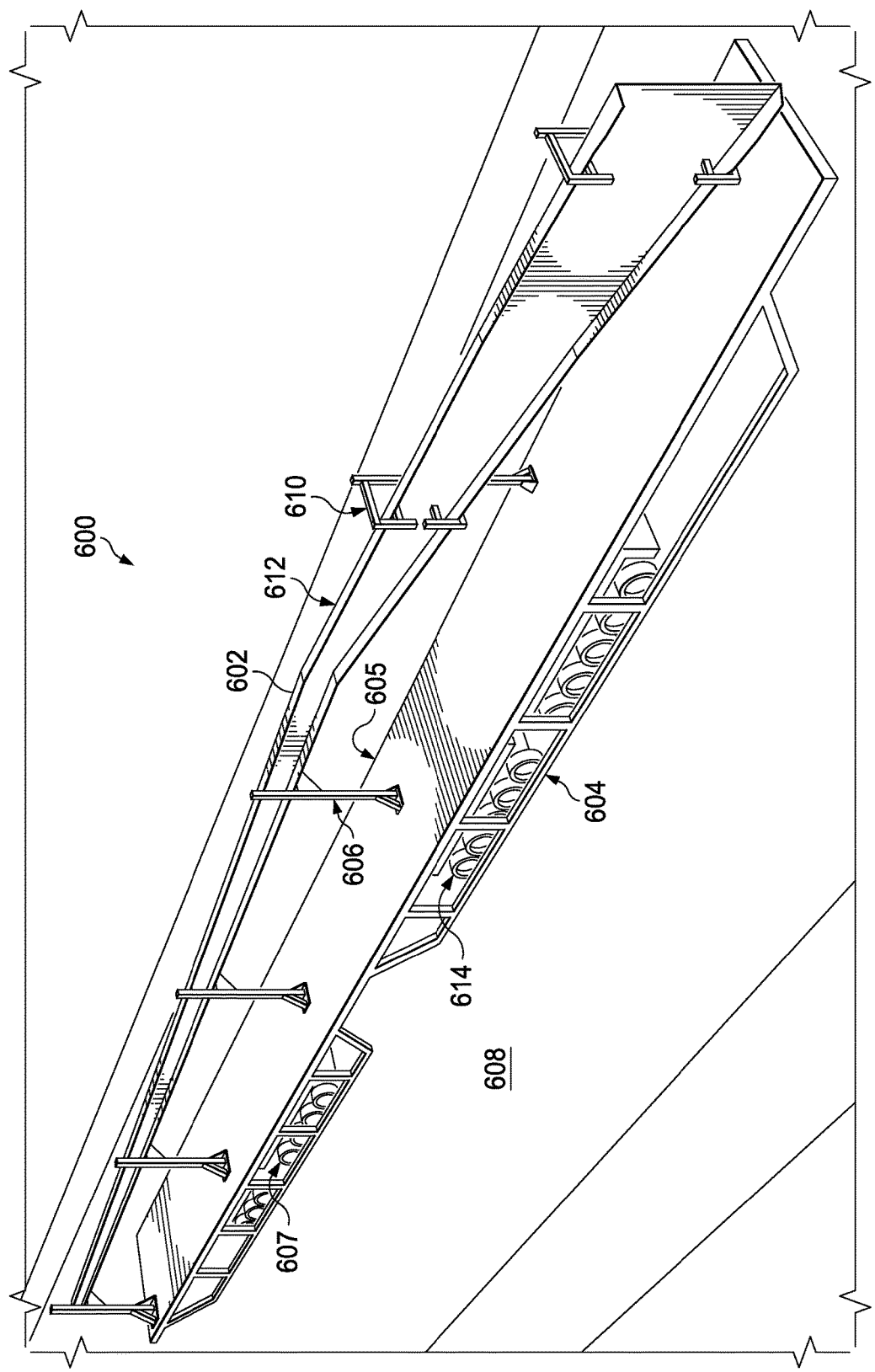
FIG. 6 is an illustration of an isometric view of a manufacturing environment in accordance with an illustrative embodiment.

With reference now to FIG. 6, an illustration of an isometric view of a manufacturing environment is depicted in accordance with an illustrative embodiment. In this illustrative example, manufacturing environment 600 may be an example of one implementation for manufacturing environment 100 in FIG. 1. A spar assembly, similar to spar assembly 102 described in FIG. 1, may be built within manufacturing environment 600.

As depicted, spar 602 is being supported and held by mobile tooling system 604. Spar 602 may be an example of one implementation for spar 106 in FIG. 1. Mobile tooling system 604 may be an example of one implementation for mobile tooling system 113 in FIGS. 1 and 2.

Mobile tooling system 604 may include base structure 605, holding tool 606, and transport system 607. Base structure 605, holding tool 606, and transport system 607 may be examples of implementations for base structure 200, holding tool 118, and transport system 120, respectively, in FIG. 2.

In this illustrative example, holding tool 606 includes plurality of clamping devices 610 that hold spar 602 in selected configuration 612 relative to base structure 605. Transport system 607 may be used to move holding tool 606 carrying spar 602 across floor 608 to, from, and between stage areas. In this illustrative example, transport system 607 includes plurality of autonomous vehicles 614.

Figure 7:
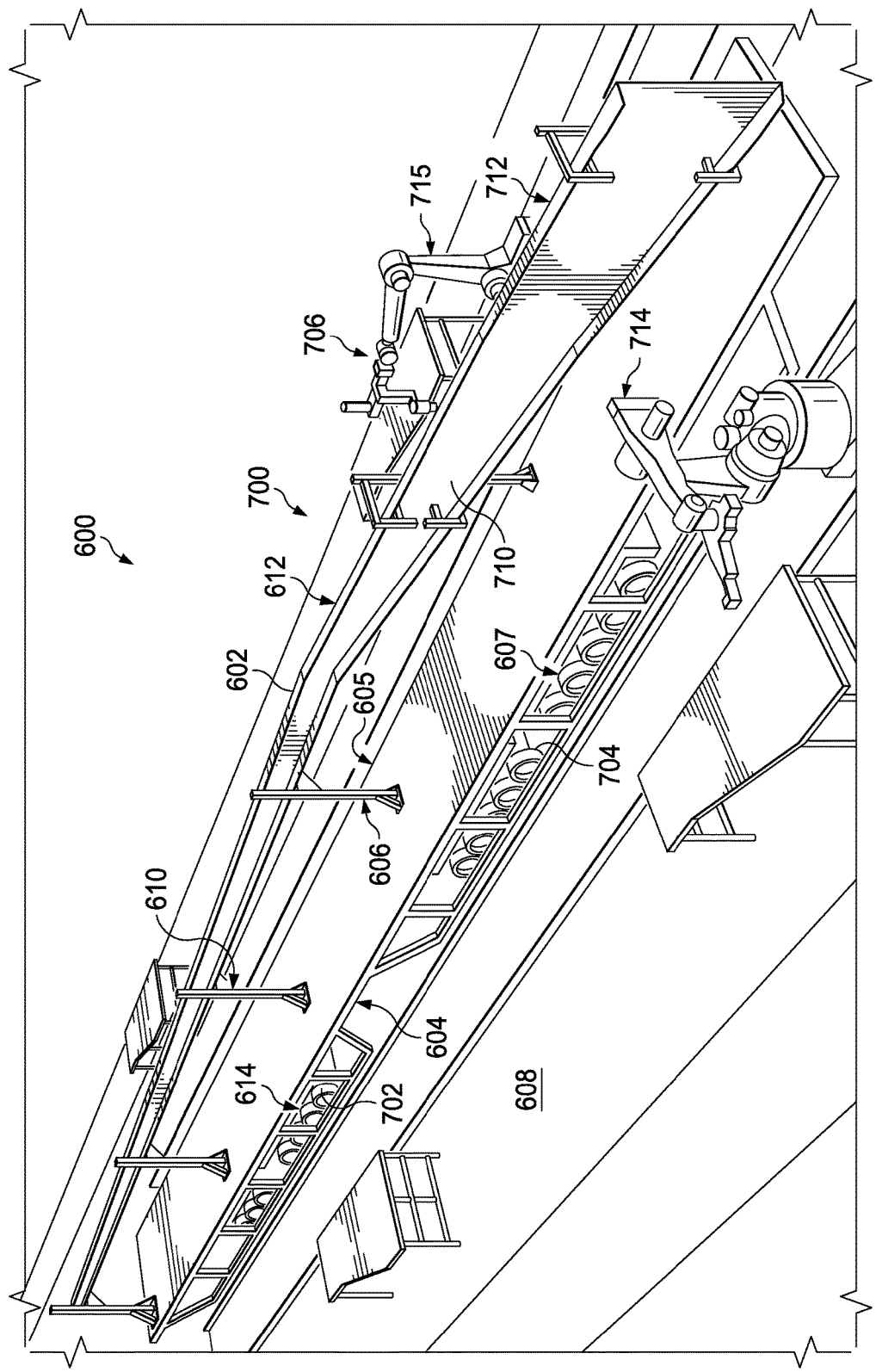
FIG. 7 is an illustration of a set of first stage robotic systems performing operations within a first stage area in accordance with an illustrative embodiment.

With reference now to FIG. 7, an illustration of a set of first stage robotic systems performing operations within a first stage area is depicted in accordance with an illustrative embodiment. As depicted, mobile tooling system 604 has moved spar 106 into first stage area 700.

Plurality of autonomous vehicles 614 includes autonomous vehicle 702 and autonomous vehicle 704. Autonomous vehicle 702 and autonomous vehicle 704 have transported holding tool 606 with spar 602 to first stage area 700, while maintaining spar 602 in selected configuration 612.

Set of first stage robotic systems 706 may be present in first stage area 700. Set of first stage robotic systems 706 may include robotic system 714 and robotic system 715. Robotic system 714 may be positioned at first side 710 of spar 602, while robotic system 715 may be positioned at second side 712 of spar 602. Robotic system 714 and robotic system 715 may be used to install a plurality of parts on spar 602. Each part may be picked up and placed in a position relative to spar 602 in a manner that provides an optimal or best fit between the part and spar 602. In particular, metrology data for a region of spar 602 onto which the part is to be installed and metrology data for the part may be used to control the manner in which the part is positioned relative to the spar by either robotic system 714 or robotic system 715. The metrology data may be used to perform a feature-to-feature coordination that enables desired mating between the part and spar 602.

Figure 8:
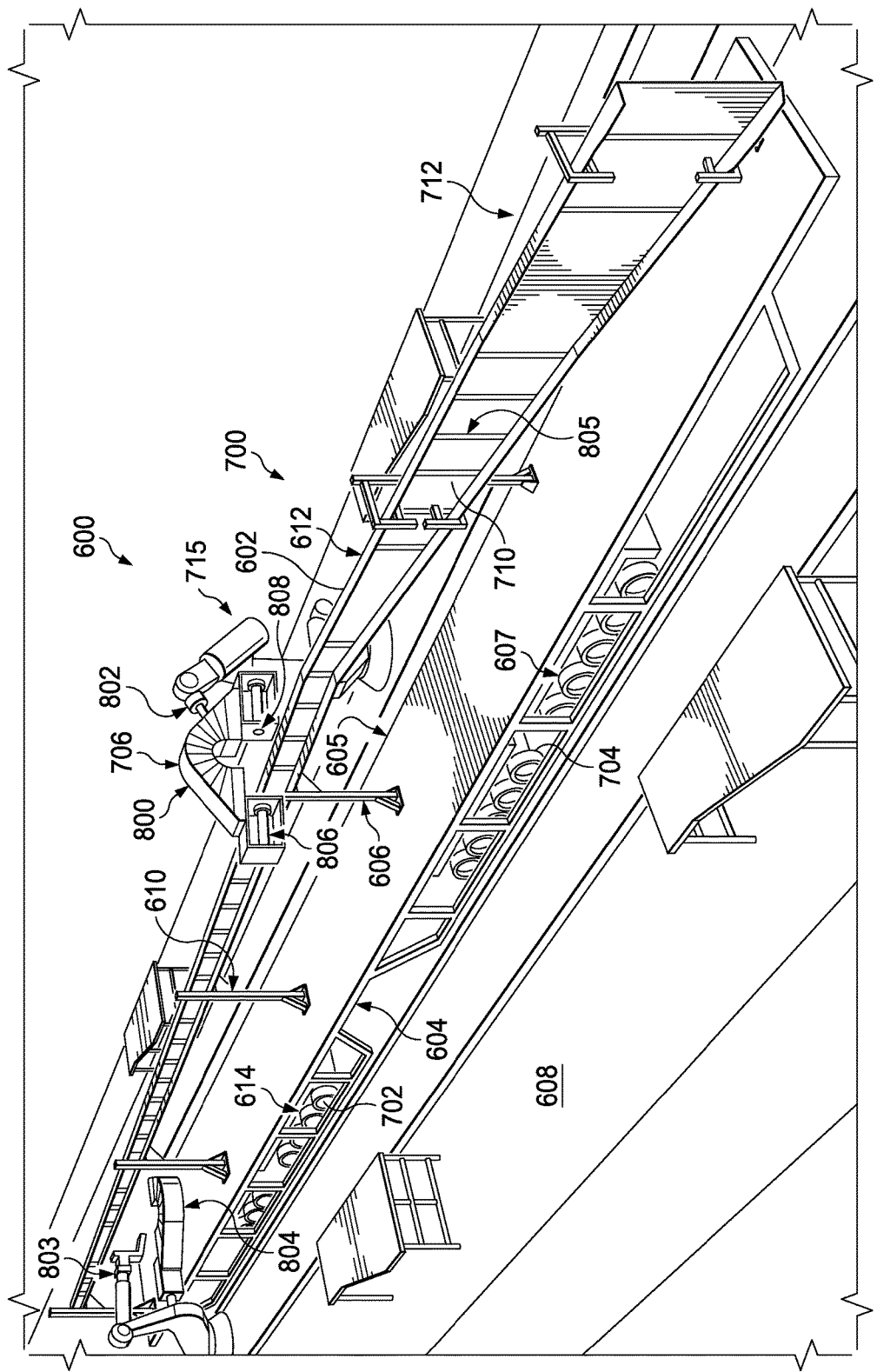
FIG. 8 is an illustration of different types of robotic systems performing operations within a first stage area in accordance with an illustrative embodiment.

With reference now to FIG. 8, an illustration of different types of robotic systems performing operations within first stage area 700 is depicted in accordance with an illustrative embodiment. In this illustrative example, set of first stage robotic systems 706 includes robotic system 800 having C-frame end effector 802 and robotic system 803 having C-frame end effector 804. Consequently, robotic system 800 and robotic system 803 may be referred to as C-frame robotic systems.

Each of C-frame end effector 802 and C-frame end effector 804 may have tooling that allows parts that are positioned relative to spar 602 to be fastened to spar 602. For example, C-frame end effector 802 may be used to fasten stiffeners 805 to spar 602. C-frame end effector 802 has multi-function tooling 806 and multi-function tooling 808 in this illustrative example. The C-shape of C-frame end effector 802 allows multi-function tooling 806 to be positioned at first side 710 of spar 602, while multi-function tooling 808 is simultaneously positioned at second side 712 of spar 602. In one illustrative example, stiffeners 805 may be installed on second side 712 of spar 602 and drilling may be performed at second side 712 of spar 602.

Any combination of robotic systems and operations may be used within first stage area 700, depending on the implementation. In one illustrative example, multiple pick-and-place robotic systems may work in conjunction with multiple C-frame robotic systems to install parts on spar 106. These multiple robotic systems may be needed to meet desired assembly rates. In other illustrative examples, the number of pick-and-place robotic systems used may be reduced. In some cases, the pick-and-place robotic systems may not be used within first stage area 700. Rather, multiple C-frame robotic systems may be used at different tooling positions along spar 602 to meet desired assembly rates.

Figure 9:
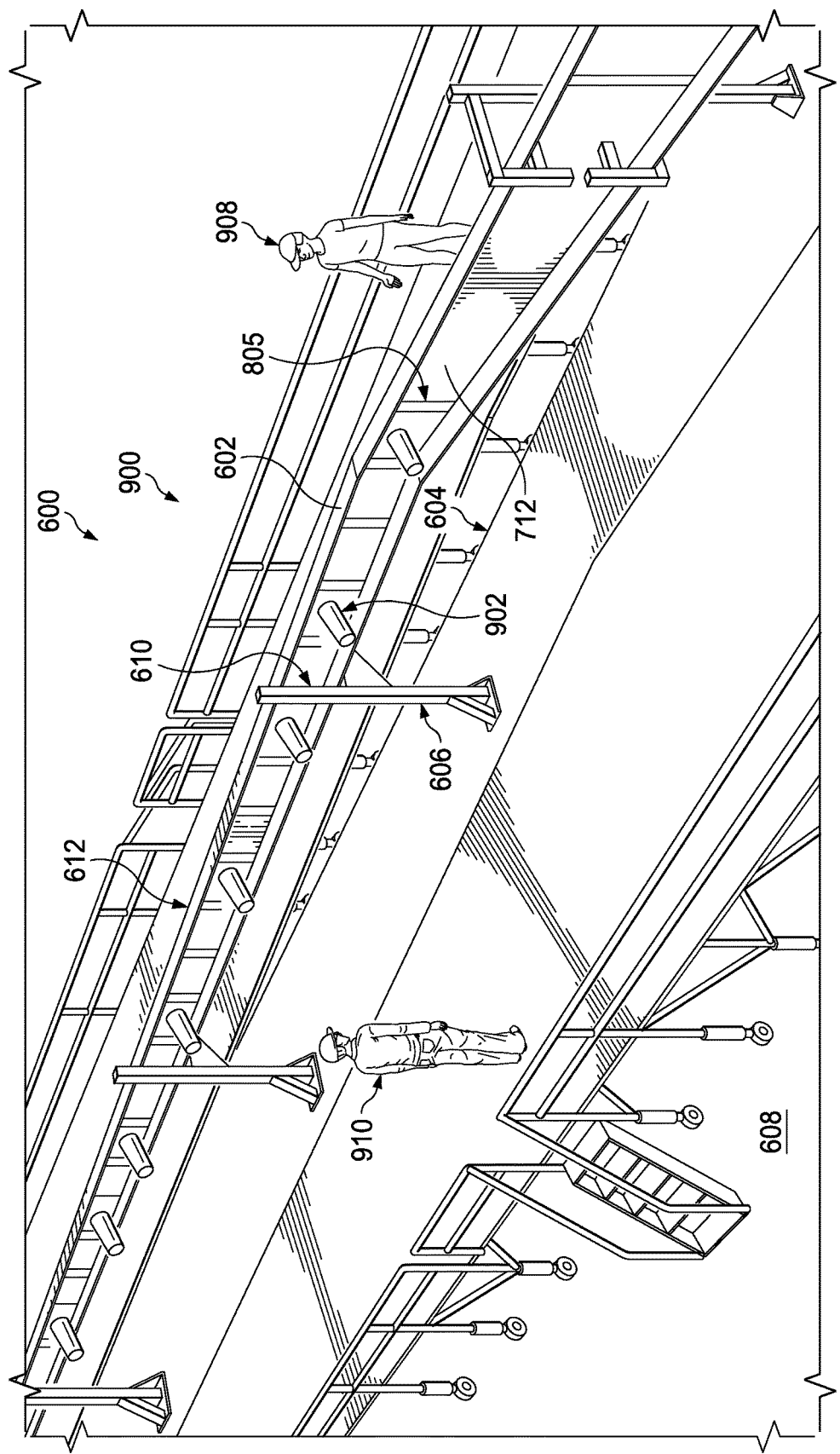
FIG. 9 is an illustration of operations being performed within a second stage area in accordance with an illustrative embodiment.

With reference now to FIG. 9, an illustration of operations being performed within a second stage area is depicted in accordance with an illustrative embodiment. In this illustrative example, mobile tooling system 604 has moved spar 602 to second stage area 900. In second stage area 900, human operator 908 and human operator 910 may install major fittings 902 onto spar 602. In other illustrative examples, robotic systems may be used to install these major fittings 902. For example, at least one robotic system comprising at least one orbital drilling robot, implemented in a manner similar to orbital drilling robot 320 in FIG. 3, may be used to perform drilling operations for the installation of major fittings onto spar 602.

Figure 10:
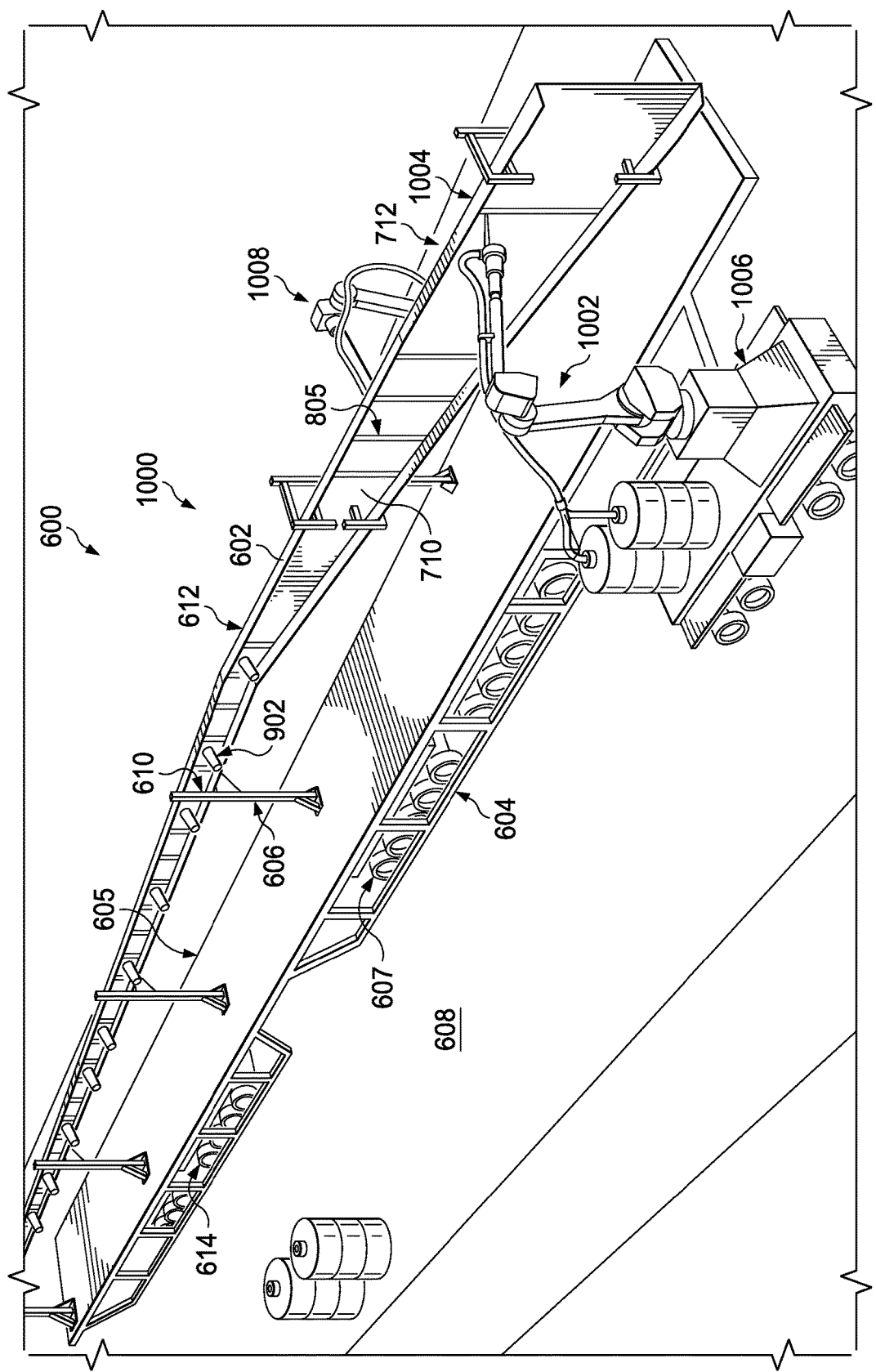
FIG. 10 is an illustration of operations being formed within a third stage area in accordance with an illustrative embodiment.

With reference now to FIG. 10, an illustration of operations being performed within a third stage area is depicted in accordance with an illustrative embodiment. In this illustrative example, mobile tooling system 604 has moved spar 602 to third stage area 1000. Set of third stage robotic systems 1002 may be used to apply sealant onto spar assembly 1004 formed by spar 602, stiffeners 805, and other parts attached to spar 602.

Set of third stage robotic systems 1002 includes robotic system 1006 and robotic system 1008. Robotic system 1006 applies sealant to spar assembly 1004 at first side 710 of spar 602. Robotic system 1008 applies sealant to spar assembly 1004 at second side 712 of spar 602.

Figure 11:
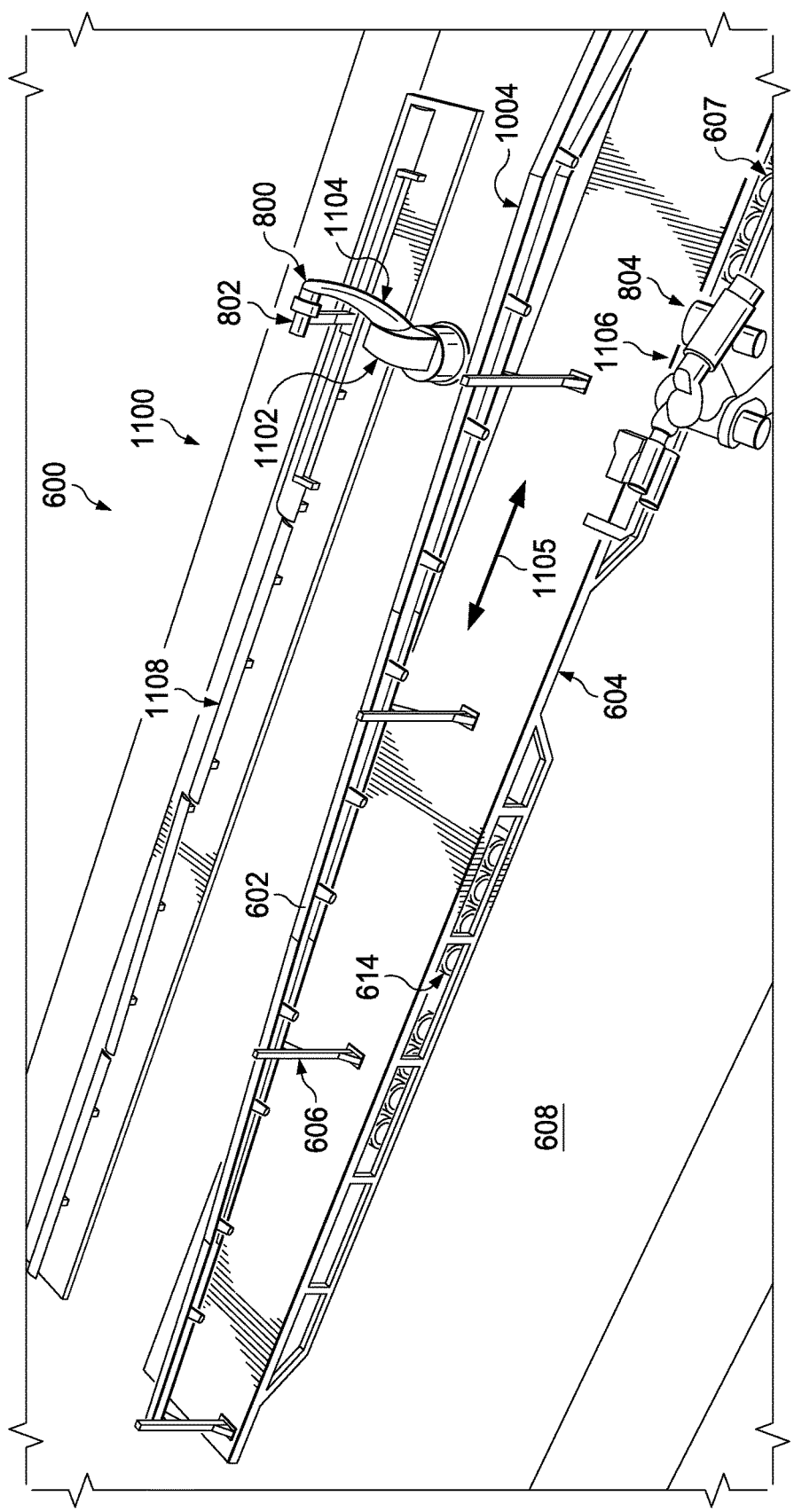
FIG. 11 is an illustration of operations being performed within a fourth stage area in accordance with an illustrative embodiment.

With reference now to FIG. 11, an illustration of operations being performed within a fourth stage area is depicted in accordance with an illustrative embodiment. In this illustrative example, mobile tooling system 604 has moved spar assembly 1004 to fourth stage area 1100. Within fourth stage area 1100, set of fourth stage robotic systems 1102 may be used to install set of leading edge members 1108 onto spar assembly 1004.

As depicted, set of fourth stage robotic systems 1102 may include robotic system 1104 and robotic system 1106. Robotic system 1104 and robotic system 1106 may move relative to spar assembly 1004 in the direction of arrow 1105 to install set of leading edge members 1108.

Each of set of leading edge members 1108 may be comprised of a plurality of components such as, for example, without limitation, ribs, at least one skin, one or more other types of components, or some combination thereof. In other illustrative examples, robotic system 1104, robotic system 1106, one or more other types of robotic systems, or some combination thereof may be used to individually install the components that make up each of set of leading edge members 1108. In this manner, each of set of leading edge members 1108 may be built up on spar assembly 1004.

Each of set of leading edge members 1108 may be positioned relative to spar assembly 1004 using metrology-based positioning. In this illustrative example, the placement of each leading edge member relative to spar assembly 1004 may be further refined using component-to-component indexing based on the physical features of spar assembly 1004, the leading edge member, or both. For example, without limitation, a control system may compute a position relative to spar assembly 1004 at which the leading edge member is to be placed. This position may be computed based on metrology data. The computed position may be used to modify a movement plan of robotic system 1104 for moving the leading edge member towards spar assembly 1004.

In other illustrative examples, the modified movement plan may ensure that robotic system 1104 positions the leading edge member at the computed position within selected tolerances. However, in other illustrative examples, the modified movement plan may ensure that robotic system 1104 positions the leading edge member a selected distance away from the computed position. For example, the computed position may be a position along a top edge of spar assembly 1004. The modified movement plan may cause robotic system 1104 to roughly position the leading edge member a selected distance below the computed position.

Once the leading edge member has been roughly positioned, component-to-component indexing may then be used to finely position the leading edge member along the top edge of spar assembly 1004. For example, without limitation, robotic system 1104 may move the leading edge member upwards along a surface of spar assembly 1004 until a number of physical features are encountered by the leading edge member. The number of physical features may include, for example, an interface between at least two surfaces that define the top edge of spar assembly 1004. Using this type of physical positioning may achieve a fit between the leading edge member and spar assembly 1004 that is within tight selected tolerances.

Figure 12:
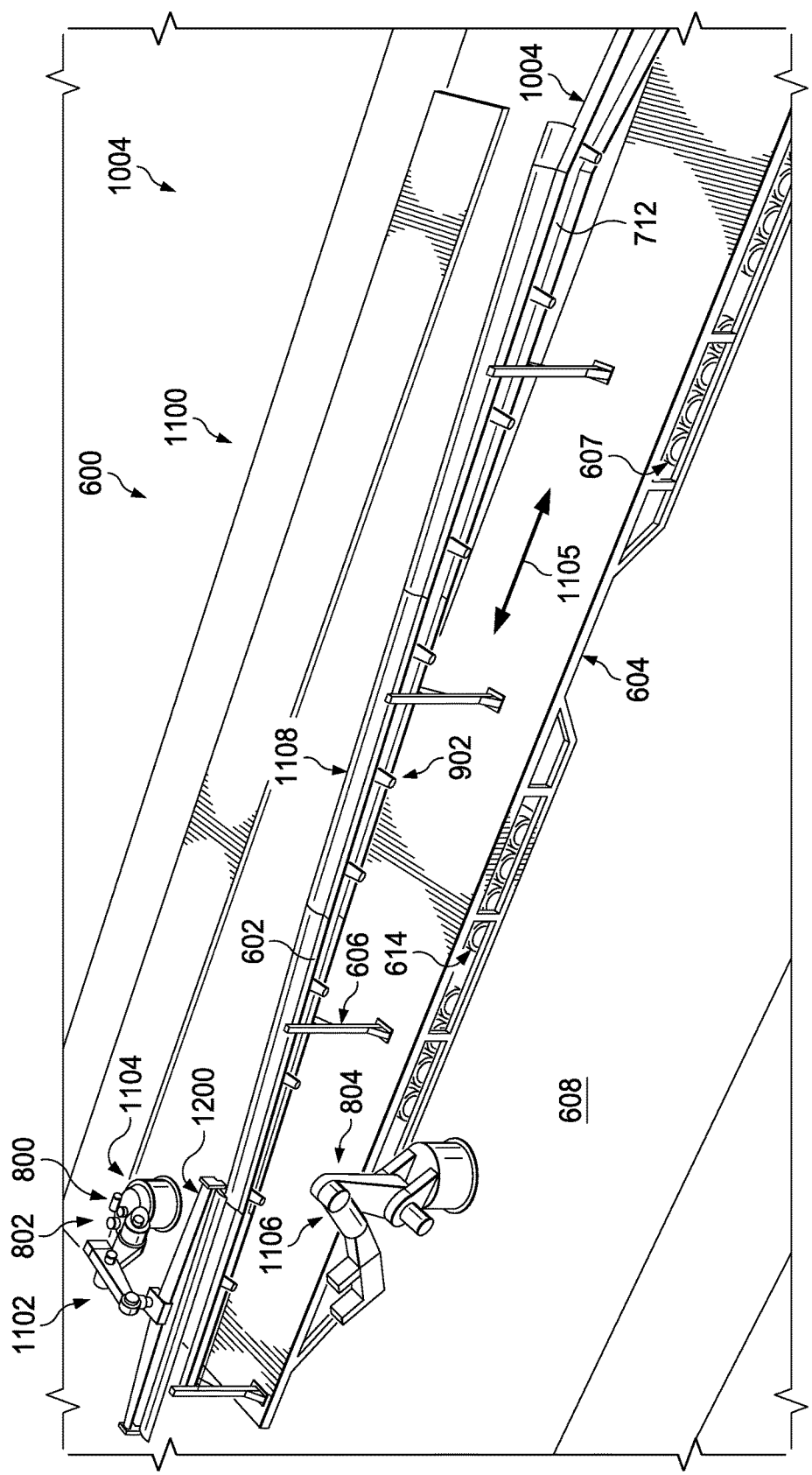
FIG. 12 is an illustration of a final leading edge member for a fixed leading edge being fastened to a spar assembly in accordance with an illustrative embodiment.

With reference now to FIG. 12, an illustration of a final leading edge member for a fixed leading edge being fastened to a spar assembly is depicted in accordance with an illustrative embodiment. In this illustrative example, robotic system 1104 is positioning leading edge member 1200 relative to spar assembly 1004. Robotic system 1006 may be used to fasten leading edge member 1200 to spar assembly 1004. Once leading edge member 1200 has been fully installed, a fixed leading edge may then be considered completely installed on spar assembly 1004.

The illustrations of a process for building a spar assembly in FIGS. 6-12 are not meant to imply physical or architectural limitations to the manner in which an illustrative embodiment may be implemented. Other components in addition to or in place of the ones illustrated may be used. Some components may be optional.

The different components shown in FIGS. 6-12 may be illustrative examples of how components shown in block form in FIGS. 1-5 can be implemented as physical structures. Additionally, some of the components in FIGS. 6-12 may be combined with components in FIGS. 1-5, used with components in FIGS. 1-5, or a combination of the two.

Figure 13:
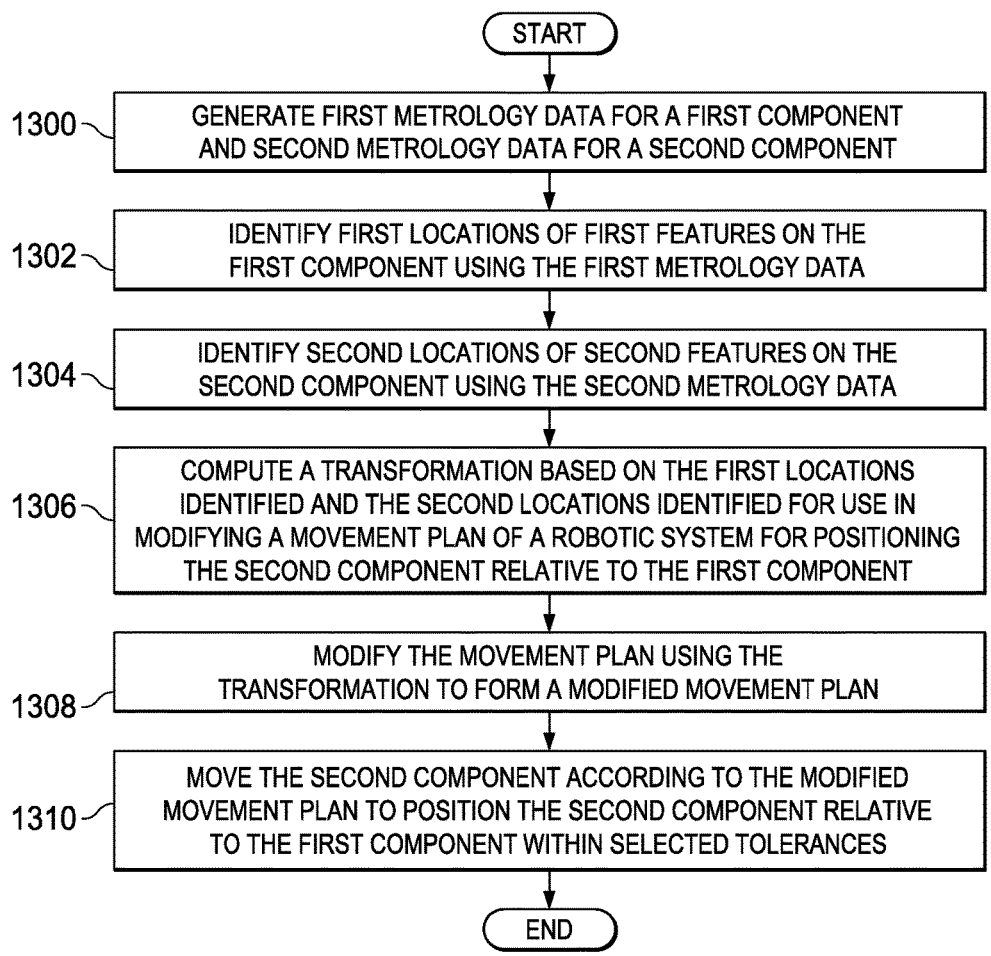
FIG. 13 is an illustration of a process for positioning one component relative to another component in the form of a flowchart in accordance with an illustrative embodiment.

With reference now to FIG. 13, an illustration of a process for positioning one component relative to another component is depicted in the form of a flowchart in accordance with an illustrative embodiment. The process illustrated in FIG. 13 may be implemented using control system 116 described in FIGS. 1 and 5.

The process may begin by generating first metrology data for a first component and second metrology data for a second component (operation 1300). In one illustrative example, the first component may take the form of an aerospace structure and the second component may take the form of a part to be mated with the aerospace structure to form an assembly. The aerospace structure may take the form of, for example, without limitation, a spar. The assembly formed using the spar may be a spar assembly.

Next, first locations of first features on the first component may be identified using the first metrology data (operation 1302). Second locations of second features on the second component may be identified using the second metrology data (operation 1304).

Thereafter, a transformation based on the first locations identified and the second locations identified may be computed for use in modifying a movement plan of a robotic system for positioning the second component relative to the first component (operation 1306). The process may also include modifying the movement plan using the transformation to form a modified movement plan (operation 1308). The second component may be moved according to the modified movement plan to position the second component relative to the first component within selected tolerances (operation 1310), with the process terminating thereafter.

In other illustrative examples, instead of the process terminating, additional operations may be performed to validate that the fit between the components meets desired specifications. For example, without limitation, any number of sensors may be used to validate that any gaps between the components and the installation preload are within selected tolerances. The sensors used may include any number of metrology sensors, such as the ones used to generate the first metrology data and the second metrology data in operation 1300 above, any number of force sensors, other types of sensors, or some combination thereof.

When the fit between the components does not meet desired specifications, an adjustment algorithm may be used to determine whether a better alternative fit may be achieved. For example, the force data, component gap data, or both may be compared to allowable limits. If the force data, the component gap data, or both fall outside of selected tolerances with respect to these allowable limits, then the adjustment algorithm may be used to determine whether a better alternative fit may be achieved. If a better alternative fit may be achieved, at least one of the second component and the first component may be re-positioned or adjusted to achieve the alternative fit. If a better alternative fit cannot be achieved or if neither fit meets specification requirements, the second component, in some cases, may be returned to storage. An alert may be generated to a supervisor that the part was not installed. The alert may take the form of, for example, without limitation, an audio alert such as a beeping sound, a visual alert such as a flashing light, some other type of alert, or some combination thereof.

Figure 14:
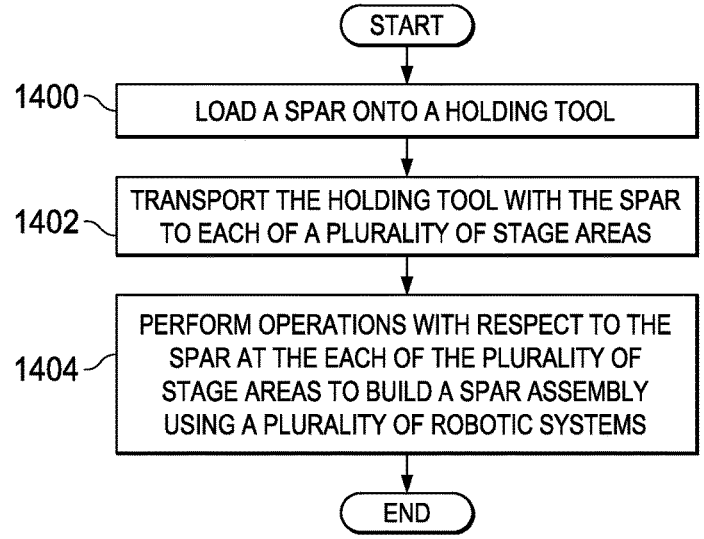
FIG. 14 is an illustration of a process for building a spar assembly in the form of a flowchart in accordance with an illustrative embodiment.

With reference now to FIG. 14, an illustration of a process for building a spar assembly is depicted in the form of a flowchart in accordance with an illustrative embodiment. The process illustrated in FIG. 14 may be implemented to build a spar assembly, such as spar assembly 102 in FIG. 1.

The process may begin by loading a spar onto a holding tool (operation 1400). The holding tool with the spar may be transported autonomously to each of a plurality of stage areas (operation 1402). Operations may be performed with respect to the spar at each of the plurality of stage areas to build a spar assembly using a plurality of robotic systems (operation 1404), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 15:
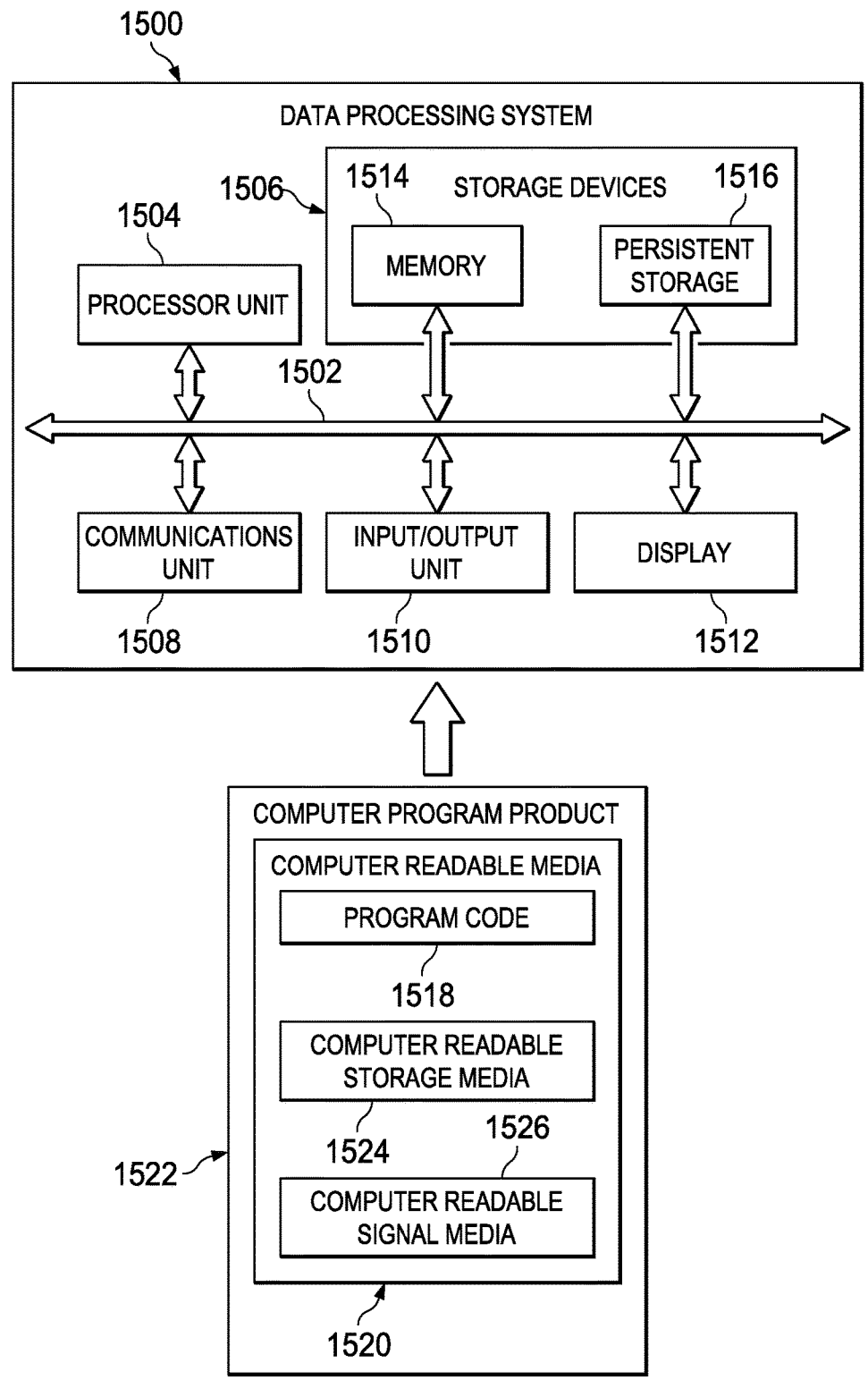
FIG. 15 is an illustration of a data processing system in the form of a block diagram in accordance with an illustrative embodiment.

Turning now to FIG. 15, an illustration of a data processing system is depicted in the form of a block diagram in accordance with an illustrative embodiment. Data processing system 1500 may be used to implement at least one of control system 116 in FIGS. 1 and 5 or one or more of set of controllers 500 in FIG. 5. As depicted, data processing system 1500 includes communications framework 1502, which provides communications between processor unit 1504, storage devices 1506, communications unit 1508, input/output unit 1510, and display 1512. In some cases, communications framework 1502 may be implemented as a bus system.

Processor unit 1504 is configured to execute instructions for software to perform a number of operations. Processor unit 1504 may comprise a number of processors, a multi-processor core, and/or some other type of processor, depending on the implementation. In some cases, processor unit 1504 may take the form of a hardware unit, such as a circuit system, an application specific integrated circuit (ASIC), a programmable logic device, or some other suitable type of hardware unit.

Instructions for the operating system, applications, and/or programs run by processor unit 1504 may be located in storage devices 1506. Storage devices 1506 may be in communication with processor unit 1504 through communications framework 1502. As used herein, a storage device, also referred to as a computer readable storage device, is any piece of hardware capable of storing information on a temporary and/or permanent basis. This information may include, but is not limited to, data, program code, and/or other information.

Memory 1514 and persistent storage 1516 are examples of storage devices 1506. Memory 1514 may take the form of, for example, a random access memory or some type of volatile or non-volatile storage device. Persistent storage 1516 may comprise any number of components or devices. For example, persistent storage 1516 may comprise a hard drive, a flash memory, a rewritable optical disk, a rewritable magnetic tape, or some combination of the above. The media used by persistent storage 1516 may or may not be removable.

Communications unit 1508 allows data processing system 1500 to communicate with other data processing systems and/or devices. Communications unit 1508 may provide communications using physical and/or wireless communications links.

Input/output unit 1510 allows input to be received from and output to be sent to other devices connected to data processing system 1500. For example, input/output unit 1510 may allow user input to be received through a keyboard, a mouse, and/or some other type of input device. As another example, input/output unit 1510 may allow output to be sent to a printer connected to data processing system 1500.

Display 1512 is configured to display information to a user. Display 1512 may comprise, for example, without limitation, a monitor, a touch screen, a laser display, a holographic display, a virtual display device, and/or some other type of display device.

In this illustrative example, the processes of the different illustrative embodiments may be performed by processor unit 1504 using computer-implemented instructions. These instructions may be referred to as program code, computer usable program code, or computer readable program code and may be read and executed by one or more processors in processor unit 1504.

In these examples, program code 1518 is located in a functional form on computer readable media 1520, which is selectively removable, and may be loaded onto or transferred to data processing system 1500 for execution by processor unit 1504. Program code 1518 and computer readable media 1520 together form computer program product 1522. In this illustrative example, computer readable media 1520 may be computer readable storage media 1524 or computer readable signal media 1526.

Computer readable storage media 1524 is a physical or tangible storage device used to store program code 1518 rather than a medium that propagates or transmits program code 1518. Computer readable storage media 1524 may be, for example, without limitation, an optical or magnetic disk or a persistent storage device that is connected to data processing system 1500.

Alternatively, program code 1518 may be transferred to data processing system 1500 using computer readable signal media 1526. Computer readable signal media 1526 may be, for example, a propagated data signal containing program code 1518. This data signal may be an electromagnetic signal, an optical signal, and/or some other type of signal that can be transmitted over physical and/or wireless communications links.

The illustration of data processing system 1500 in FIG. 15 is not meant to provide architectural limitations to the manner in which the illustrative embodiments may be implemented. The different illustrative embodiments may be implemented in a data processing system that includes components in addition to or in place of those illustrated for data processing system 1500. Further, components shown in FIG. 15 may be varied from the illustrative examples shown.

Figure 16:
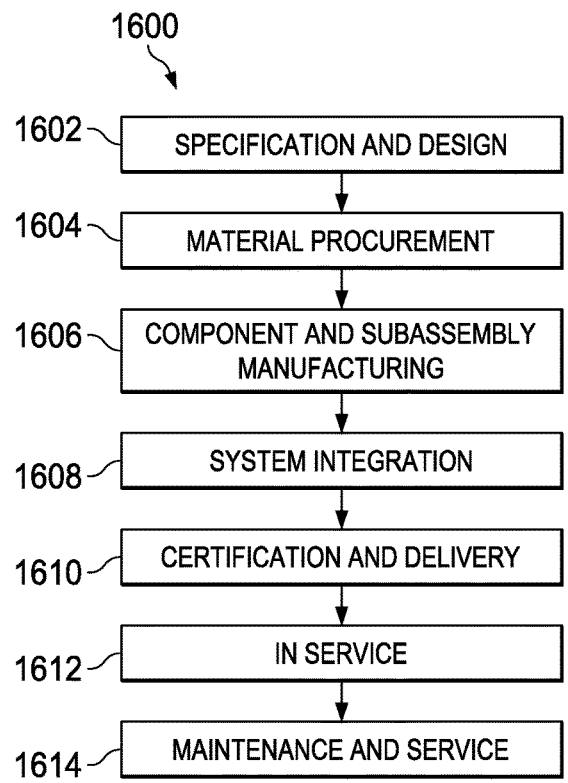
FIG. 16 is an illustration of an aircraft manufacturing and service method in the form of a block diagram in accordance with an illustrative embodiment.
Figure 17:
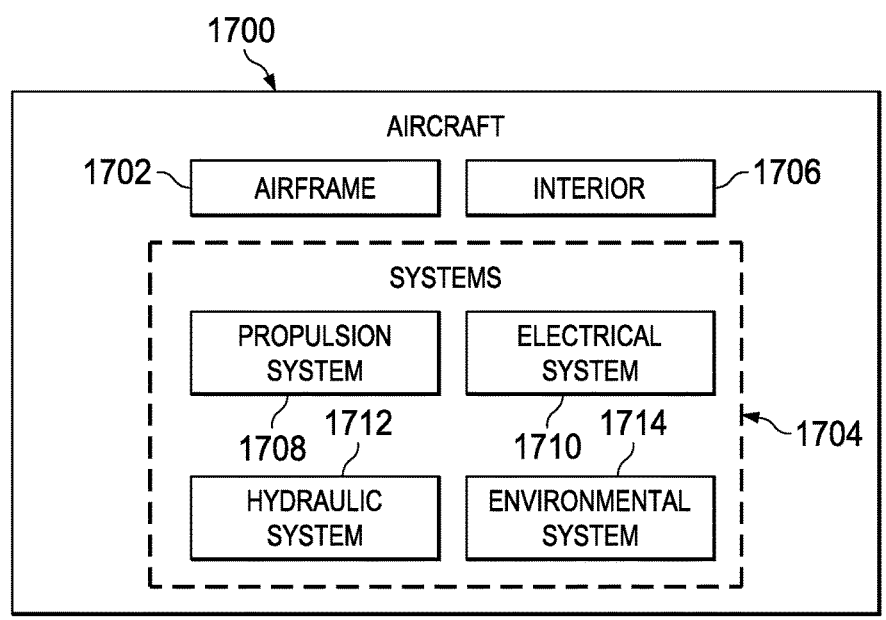
FIG. 17 is an illustration of an aircraft in the form of a block diagram in which an illustrative embodiment may be implemented.

The illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in the form of a block diagram in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in the form of a block diagram in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1600 in FIG. 16. In particular, flexible manufacturing system 112 from FIG. 1 may be used to build, for example, without limitation, spar assembly 102 in FIG. 1 during any one of the stages of aircraft manufacturing and service method 1600. For example, without limitation, flexible manufacturing system 112 from FIG. 1 may be used to build spar assembly 102 during at least one of component and subassembly manufacturing 1606, system integration 1608, routine maintenance and service 1614, or some other stage of aircraft manufacturing and service method 1600.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different illustrative embodiments may substantially expedite the assembly of and/or reduce the cost of aircraft 1700.

Thus, the illustrative embodiments provide a flexible manufacturing system that comprises a mobile tooling system, a plurality of robotic systems, and a control system. The mobile tooling system may be used to hold a spar and transport the spar to each of a plurality of stage areas. In particular, the mobile tooling system may hold the spar and any parts attached to the spar in a selected configuration as the spar is transported to each of the plurality of stage areas.

The mobile tooling system may hold the spar assembly in the selected configuration within selected tolerances in a manner that enables improved flow through the assembly line.

The plurality of robotic systems may perform at least one of part positioning operations, fastening operations, sealant operations, or fastener installation operations within each stage area of the plurality of stage areas to build a spar assembly using the spar. The control system may control the mobile tooling system and the plurality of robotic systems.

In one illustrative example, a flexible manufacturing system may include a metrology system and a control system. The metrology system may generate first metrology data for a first component and second metrology data for a second component. The control system may include a feature locator and a robot manager. The feature locator processes the first metrology data and the second metrology data to identify first locations of first features on the first component and second locations of second features on the second component. The robot manager computes a transformation based on the first locations identified and the second locations identified for use in modifying a movement plan of a robotic system for positioning the second component relative to the first component. In this manner, the robotic system positions the second component relative to the first component using the modified movement plan. In some cases, this process may be referred to as metrology-based positioning.

In some illustrative examples, the positioning of the second component relative to the first component may be further fine-tuned using component-to-component indexing. Component-to-component indexing is a physical indexing of the second component relative to the first component. Performing component-to-component indexing after performing metrology-based positioning may ensure that the fit, or "fitup," between the two components is within tight selected tolerances.

The two components described above may include a spar and any component that may be installed onto the spar or another component or sub-assembly already installed on the spar. Of course, in other illustrative examples, the components fit together using the metrology-based positioning, component-to-component indexing, or both described above may take the form of other types of aircraft components, parts, subassemblies, or assemblies. In still other illustrative examples, the components may be for a vehicle other than an aircraft. For example, the components may be for some other type of aerospace vehicle, a ground vehicle, a water vehicle such as a ship, or some other type of vehicle. In some cases, the component may be for a structural platform.

In one illustrative embodiment, an apparatus may comprise a set of first stage robotic systems for positioning parts relative to a spar of a spar assembly; a set of second stage robotic systems for performing first fastening operations on the spar assembly; a set of third stage robotic systems for applying sealant to the spar assembly; and a set of fourth stage robotic systems for performing second fastening operations on the spar assembly. The apparatus may further comprise a mobile tooling system for transporting the spar assembly between a plurality of stage areas.

The mobile tooling system may comprise a holding tool for holding the spar assembly and a transport system for moving the spar assembly between the plurality of stage areas. The holding tool may comprise a plurality of clamping devices. At least one of the plurality of clamping devices may comprise a retraction system that comprises at least one of a fly-away mechanism, a slide transfer mechanism, or a telescoping mechanism.

The transport system of the mobile tooling system may comprise a set of autonomous vehicles. In some cases, the transport system may comprise a transport line system that comprises at least one of a number of lift devices or a conveyor system.

Depending on the implementation, at least one of the set of first stage robotic systems may comprise a pick-and-place robot. At least one of the set of second stage robotic systems may comprise a fastening robot in which at least one of a drilling tool, a fastener insertion tool, or a fastener installation tool is associated with the fastening robot. At least one of the set of third stage robotic systems may comprise a sealant robot in which least one of an applicator or a fillet tool is associated with the sealant robot. The applicator may take the form of or include a brush.

In some illustrative examples, at least one robotic system in the set of first stage robotic systems, the set of second stage robotic systems, the set of third stage robotic systems, and the set of fourth stage robotic systems may comprise a multi-function robot. At least one of a pick-and-place tool, a set of fastening tools, or a sealant tool may be associated with the multi-function robot. Of course, any number of other types of tools may be associated with the multi-function robot. In some examples, at least one robotic system in the set of first stage robotic systems, the set of second stage robotic systems, the set of third stage robotic systems, and the set of fourth stage robotic systems may comprise a C-frame multi-function end effector.

The apparatus may further comprise a control system that controls at least one of the set of first stage robotic systems, the set of second stage robotic systems, the set of third stage robotic systems, and the set of fourth stage robotic systems. In some cases, the apparatus may comprise a sensor system that generates sensor data about a plurality of part index features. The control system may identify a plurality of locations for the plurality of part index features and transform a reference coordinate system based on the plurality of locations to form a modified reference coordinate system that may then be used for positioning of at least one component relative to another component.

In one illustrative example, a method for building a spar assembly is provided. A spar may be loaded onto a holding tool. The holding tool with the spar may be transported to each of a plurality of stage areas. Operations may be performed with respect to the spar at each of the plurality of stage areas to build the spar assembly using a plurality of robotic systems.

The method may further include generating sensor data for a plurality of part index features on the spar assembly using a sensor system. The method may further include identifying a plurality of locations for the plurality of part index features on the spar assembly using the sensor data and transforming a reference coordinate system for the spar assembly into a modified reference coordinate system based on the plurality of locations identified.

The method may still further include generating a number of commands to control at least one of the plurality of robotic systems based on the modified reference coordinate system. Generating the number of commands may include generating a number of commands to position a tool center point corresponding to one of the plurality of robotic systems relative to a location on the spar assembly at which an operation is to be performed.

Transporting the holding tool may comprise transporting the holding tool with the spar to each of a first stage area, a second stage area, a third stage area, and a fourth stage area using a transport system. Transporting the holding tool may comprise transporting the holding tool with the spar using a transport line system. In some cases, transporting the holding tool may comprise transporting the holding tool with the spar using a set of autonomous vehicles.

Performing the operations to build the spar assembly may include performing part installation operations within a first stage area using a set of first stage robotic systems. In some cases, performing the part installation operations may include positioning a plurality of parts relative to the spar based on commands received from a control system. In some cases, performing the operations may include performing drilling operations within a second stage area using a set of second stage robotic systems.

In some cases, performing the operations may include performing sealant operations within a third stage area using a set of third stage robotic systems. Further, in some cases, performing the operations may include performing fastener installation operations to install a leading edge on the spar assembly within a fourth stage area using a set of fourth stage robotic systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a metrology system that generates first metrology data for a first component and second metrology data for a second component;
a feature locator that processes the first metrology data and the second metrology data to identify first locations of first features on the first component and second locations of second features on the second component;
a robot manager that computes a transformation based on the first locations identified and the second locations identified and modifies a movement plan of a robotic system using the transformation to form a modified movement plan, wherein the movement plan comprises a number of movements of the robotic system for positioning the second component relative to the first component; and
the robotic system, wherein the robotic system moves the second component according to the modified movement plan to position the second component relative to the first component.

2. The apparatus of claim 1, wherein positioning the second component relative to the first component using the modified movement plan enables desired mating between the first component and the second component.

3. The apparatus of claim 1, wherein the metrology system comprises at least one of an imaging system or a laser system.

4. The apparatus of claim 3 further comprising:
a transport system that transports the first component to each of a plurality of stage areas.

5. The apparatus of claim 1, wherein the feature locator and the robot manager are part of a control system.

6. The apparatus of claim 1 further comprising:
a holding tool that holds the first component in a selected configuration.

7. The apparatus of claim 1 further comprising:
a mobile tooling system that holds the first component in a selected configuration and transports the first component to each of a plurality of stage areas.

8. The apparatus of claim 1, wherein each of the first features and the second features is selected from a group consisting of a hole, an edge, a ridge, or a marking.

9. The apparatus of claim 1, wherein the first component is an aerospace structure and the second component is a part to be mated with the aerospace structure to form an assembly.

10. The apparatus of claim 1, wherein the first component is a spar and the second component is a part to be mated with the spar to form a spar assembly.

11. A method for positioning one component relative to another component, the method comprising:
generating first metrology data for a first component and second metrology data for a second component;
identifying first locations of first features on the first component using the first metrology data;
identifying second locations of second features on the second component using the second metrology data;
computing a transformation based on the first locations identified and the second locations identified;
modifying a movement plan of a robotic system using the transformation to form a modified movement plan, wherein the movement plan comprises a number of movements of the robotic system for positioning the second component relative to the first component; and
moving the second component by the robotic system according to the modified movement plan to position the second component relative to the first component.

12. The method of claim 11, wherein moving the second component comprises:
positioning the second component relative to the first component within selected tolerances to enable a desired mating between the first component and the second component.

13. The method of claim 11 further comprising:
performing component-to-component indexing to refine a placement of the second component relative to the first component to achieve a fitup between the first component and the second component that is within selected tolerances.

14. A flexible manufacturing system comprising:
a mobile tooling system for holding a spar and transporting the spar to each of a plurality of stage areas;
a plurality of robotic systems for performing at least one of part positioning operations, fastening operations, sealant operations, and fastener installation operations within each stage area of the plurality of stage areas to build a spar assembly using the spar;
a metrology system that generates first metrology data for the spar and second metrology data for a part; and
a control system that is configured to:
control the mobile tooling system,
process the first metrology data and the second metrology data to identify first locations of first features on the spar and second locations of second features on the part, compute a transformation based on the first locations identified and the second locations identified, modify a movement plan of a robotic system in the plurality of robotic systems to form a modified movement plan, wherein the movement plan comprises a number of movements of the robotic system for positioning the part relative to the spar, and control the robotic system to move the part according to the modified movement plan to position the part relative to the spar.

15. The flexible manufacturing system of claim 14, wherein the plurality of robotic systems comprises:

a set of first stage robotic systems for positioning a plurality of parts relative to the spar while the spar assembly is at least partially located in a first stage area of the plurality of stage areas.

16. The flexible manufacturing system of claim 15, wherein the set of first stage robotic systems position the plurality of parts relative to the spar based on a number of commands received from the control system.

17. The flexible manufacturing system of claim 16, wherein the plurality of parts includes at least one of rib posts, stiffeners, hinges, or brackets.

18. The flexible manufacturing system of claim 16, wherein the set of first stage robotic systems installs the plurality of parts on the spar to build the spar assembly.

19. The flexible manufacturing system of claim 14, wherein the plurality of robotic systems comprises:

a set of second stage robotic systems that perform drilling operations on the spar assembly while the spar assembly is at least partially located in a second stage area of the plurality of stage areas.

20. The flexible manufacturing system of claim 19, wherein the set of second stage robotic systems performs orbital drilling operations to form a plurality of holes in the spar assembly that are configured to receive a plurality of fasteners.

21. The flexible manufacturing system of claim 14, wherein the plurality of robotic systems comprises:

a set of third stage robotic systems that perform the sealant operations while the spar assembly is at least partially located in a third stage area of the plurality of stage areas.

22. The flexible manufacturing system of claim 14, wherein the plurality of robotic systems comprises:

a set of fourth stage robotic systems that install a set of leading edge members on the spar assembly to form a leading edge for the spar assembly while the spar assembly is at least partially located in a fourth stage area of the plurality of stage areas.

23. The flexible manufacturing system of claim 22, wherein the set of fourth stage robotic systems positions each of the set of leading edge members relative to the spar assembly based on a number of commands received from the control system and install a plurality of fasteners to secure the each of the set of leading edge members to the spar assembly to form the leading edge for the spar assembly.

24. The flexible manufacturing system of claim 14, wherein the mobile tooling system comprises:

a holding tool; and a transport system.

25. The flexible manufacturing system of claim 24, wherein the transport system comprises:

a set of autonomous vehicles.

* * * * *